(12) United States Patent
Takizawa et al.

(10) Patent No.: US 10,300,904 B2
(45) Date of Patent: May 28, 2019

(54) MOTIVE POWER SYSTEM, TRANSPORTATION APPARATUS, AND POWER TRANSMISSION METHOD

(71) Applicant: HONDA MOTOR CO., LTD., Tokyo (JP)

(72) Inventors: Daijiro Takizawa, Wako (JP); Hirokazu Oguma, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 183 days.

(21) Appl. No.: 15/602,109

(22) Filed: May 23, 2017

(65) Prior Publication Data

US 2017/0334428 A1 Nov. 23, 2017

(30) Foreign Application Priority Data

May 23, 2016 (JP) .................. 2016-102809

(51) Int. Cl.

| | |
|---|---|
| *B60L 11/18* | (2006.01) |
| *B60W 10/08* | (2006.01) |
| *B60W 10/06* | (2006.01) |
| *B60K 6/28* | (2007.10) |
| *B60K 6/442* | (2007.10) |
| *B60W 20/13* | (2016.01) |
| *B60K 6/26* | (2007.10) |

(52) U.S. Cl.
CPC .............. *B60W 10/08* (2013.01); *B60K 6/28* (2013.01); *B60K 6/442* (2013.01); *B60W 10/06* (2013.01); *B60W 20/13* (2016.01); *B60K 2006/268* (2013.01); *B60W 2710/244* (2013.01); *B60Y 2200/92* (2013.01); *Y02T 10/6234* (2013.01); *Y02T 10/6278* (2013.01); *Y02T 10/6286* (2013.01); *Y10S 903/93* (2013.01)

(58) Field of Classification Search
CPC ...... B60W 10/08; B60W 20/13; B60W 10/06; B60K 6/28; B60K 6/442
USPC ......................................................... 701/22
See application file for complete search history.

(56) References Cited

U.S. PATENT DOCUMENTS

| | | | |
|---|---|---|---|
| 9,174,520 B2 * | 11/2015 | Katayama | ................ B60K 1/04 |
| 10,161,992 B2 * | 12/2018 | Kawamura | ........ G01R 31/2829 |
| 2007/0222420 A1 * | 9/2007 | Nishida | ................. H02J 7/0073 |
| | | | 320/162 |
| 2011/0018500 A1 * | 1/2011 | Takahashi | ............. H02J 7/0052 |
| | | | 320/148 |

(Continued)

FOREIGN PATENT DOCUMENTS

| | | |
|---|---|---|
| JP | 2014-015113 | 1/2014 |
| JP | 2015-070726 | 4/2015 |

*Primary Examiner* — Peter D Nolan
*Assistant Examiner* — Wae L Louie
(74) *Attorney, Agent, or Firm* — Mori & Ward, LLP

(57) ABSTRACT

A motive power system includes a first energy storage, a second energy storage, an actuator, an internal combustion engine, a power transmission circuit, and circuitry. At least the actuator drives a load in a charge-depleting mode using a first energy supplied from the first energy storage and/or the second energy storage according to a second charge rate. At least the internal combustion engine drives the load in a charge-sustaining mode using a second energy that is lower than the first energy and that is supplied to the actuator from the first energy storage and/or the second energy storage according to a first charge rate.

22 Claims, 18 Drawing Sheets

(56) References Cited

U.S. PATENT DOCUMENTS

| | | | |
|---|---|---|---|
| 2013/0020897 A1* | 1/2013 | Takizawa | H02K 1/276 310/156.01 |
| 2015/0236530 A1* | 8/2015 | Kato | H02J 7/0029 320/107 |
| 2016/0141586 A1* | 5/2016 | Fujii | H01M 2/206 429/99 |
| 2016/0355100 A1* | 12/2016 | Ito | B60L 11/1877 |
| 2016/0359153 A1* | 12/2016 | Kano | H01M 2/1077 |
| 2017/0054401 A1* | 2/2017 | Takizawa | H02J 7/0013 |
| 2017/0054403 A1* | 2/2017 | Ito | B60L 11/1803 |
| 2017/0088009 A1* | 3/2017 | Takizawa | B60L 11/1874 |
| 2017/0093186 A1* | 3/2017 | Takizawa | H02J 7/1492 |
| 2017/0101018 A1* | 4/2017 | Ito | B60L 11/1868 |
| 2017/0113560 A1* | 4/2017 | Oguma | B60L 11/1861 |
| 2017/0113564 A1* | 4/2017 | Unno | B60L 11/1811 |
| 2017/0120767 A1* | 5/2017 | Unno | B60L 11/1811 |
| 2017/0151886 A1* | 6/2017 | Oguma | B60L 11/1868 |
| 2017/0151887 A1* | 6/2017 | Oguma | B60L 11/08 |
| 2017/0151888 A1* | 6/2017 | Oguma | B60L 11/08 |
| 2017/0155351 A1* | 6/2017 | Oguma | B60L 11/08 |
| 2017/0210240 A1* | 7/2017 | Unno | B60L 11/1859 |
| 2017/0232851 A1* | 8/2017 | Unno | H02J 7/0054 307/10.1 |
| 2017/0232953 A1* | 8/2017 | Oguma | B60W 20/13 180/65.31 |
| 2017/0267115 A1* | 9/2017 | Unno | B60L 11/1842 |
| 2017/0267120 A1* | 9/2017 | Takizawa | B60L 11/1877 |
| 2017/0267230 A1* | 9/2017 | Lyons | B60W 20/17 |
| 2017/0271727 A1* | 9/2017 | Ito | B60K 1/04 |
| 2017/0282742 A1* | 10/2017 | Takizawa | H01M 10/44 |
| 2017/0282896 A1* | 10/2017 | Takizawa | B60W 20/13 |
| 2017/0282899 A1* | 10/2017 | Takizawa | B60L 11/1868 |
| 2017/0334428 A1* | 11/2017 | Takizawa | B60K 6/28 |
| 2017/0334429 A1* | 11/2017 | Takizawa | B60K 6/442 |
| 2017/0334430 A1* | 11/2017 | Takizawa | B60W 20/14 |
| 2017/0352926 A1* | 12/2017 | Kanomata | H01M 10/42 |

* cited by examiner

MOTIVE POWER SYSTEM, TRANSPORTATION APPARATUS, AND POWER TRANSMISSION METHOD

CROSS-REFERENCE TO RELATED APPLICATIONS

The present application claims priority under 35 U.S.C. § 119 to Japanese Patent Application No. 2016-102809, filed May 23, 2016, entitled "Motive Power System, Transportation Apparatus, and Power Transmission Method." The contents of this application are incorporated herein by reference in their entirety.

BACKGROUND

1. Field

The present disclosure relates to a motive power system, a transportation apparatus, and a power transmission method.

2. Description of the Related Art

Motive power systems of this type, which are disclosed in, for example, Japanese Unexamined Patent Application Publication Nos. 2014-15113 and 2015-70726, are known in the related art. Japanese Unexamined Patent Application Publication No. 2014-15113 describes a technique for a hybrid vehicle having two energy storage devices. In this technique, two modes are provided to enable wide-range travel in a travel mode of an electric vehicle (EV). One of the modes is a mode in which the voltage of an energy storage device on the low-capacity side is boosted so that a voltage for driving a motor generator when an engine is started becomes equal to the voltage of an energy storage device on the high-capacity side. The other mode is a mode in which the voltage of the energy storage device on the low-capacity side is boosted so that the voltage for driving the motor generator when the engine is started is higher than the voltage of the energy storage device on the high-capacity side.

Japanese Unexamined Patent Application Publication No. 2015-70726 describes a technique for a hybrid vehicle having two energy storage devices, for supplying power to an electric motor from only a high-capacity energy storage device when the required output for electric power is less than a threshold and supplying power to the electric motor from both energy storage devices when the required output for electric power is greater than the threshold.

The hybrid vehicles as disclosed in Japanese Unexamined Patent Application Publication Nos. 2014-15113 and 2015-70726 can be each regarded as, in a more generalized term, a motive power system that includes an internal combustion engine and an actuator as motive power sources for driving a target load and that also includes two energy storage devices as power supplies for the actuator.

SUMMARY

According to a first aspect of the present invention, a motive power system includes a first energy storage device, a second energy storage device, an actuator, an internal combustion engine, a power transmission circuit unit, and a control device. The second energy storage device has a higher power density and a lower energy density than the first energy storage device. The actuator outputs motive power for driving a target load in response to power supplied from at least one of the first energy storage device and the second energy storage device. The internal combustion engine outputs motive power for driving the target load. The power transmission circuit unit has a function of performing power transmission among the first energy storage device, the second energy storage device, and the actuator. The control device has a function of controlling the power transmission circuit unit by using a charge-depleting mode and a charge-sustaining mode. The charge-depleting mode is a mode in which at least the motive power of the actuator is usable as motive power for driving the target load so that a total stored energy of the first energy storage device and the second energy storage device is consumed. The charge-sustaining mode is a mode in which at least the motive power of the internal combustion engine is usable as motive power for driving the target load so that the total stored energy of the first energy storage device and the second energy storage device is less consumed than in the charge-depleting mode. The control device is configured to control the power transmission circuit unit in the charge-depleting mode in a manner corresponding to a second charge rate that is a charge rate of the second energy storage device. The control device is configured to control the power transmission circuit unit in the charge-sustaining mode in a manner corresponding to a first charge rate that is a charge rate of the first energy storage device.

According to a second aspect of the present invention, a power transmission method for a motive power system including a first energy storage device, a second energy storage device having a higher power density and a lower energy density than the first energy storage device, an actuator that outputs motive power for driving a target load in response to power supplied from at least one of the first energy storage device and the second energy storage device, and an internal combustion engine that outputs motive power for driving the target load includes performing power transmission among the first energy storage device, the second energy storage device, and the actuator by using a charge-depleting mode and a charge-sustaining mode. The charge-depleting mode is a mode in which at least the motive power of the actuator is usable as motive power for driving the target load so that a total stored energy of the first energy storage device and the second energy storage device is consumed. The charge-sustaining mode is a mode in which at least the motive power of the internal combustion engine is usable as motive power for driving the target load so that the total stored energy of the first energy storage device and the second energy storage device is less consumed than in the charge-depleting mode. In the charge-depleting mode, the power transmission is performed in a manner corresponding to a second charge rate that is a charge rate of the second energy storage device. In the charge-sustaining mode, the power transmission is performed in a manner corresponding to a first charge rate that is a charge rate of the first energy storage device.

According to a third aspect of the present invention, a motive power system includes a first energy storage, a second energy storage, an actuator, an internal combustion engine, a power transmission circuit, and circuitry. The first energy storage has a first power density and a first energy density. The second energy storage has a second power density higher than the first power density and a second energy density lower than the first energy density. The actuator drives a load using electric power supplied from at least one of the first energy storage and the second energy storage. The internal combustion engine drives the load. The actuator is connected to the first energy storage and to the second energy storage via the power transmission circuit. The circuitry is configured to control the internal combustion engine and the power transmission circuit to drive the load selectively in a charge-depleting mode or in a charge-sustaining mode, at least the actuator driving the load in the charge-depleting mode using a first energy supplied from the first energy storage and/or the second energy storage according to a second charge rate of the second energy storage, at least the internal combustion engine driving the load in the charge-sustaining mode using a second energy that is lower than the first energy and that is supplied to the actuator from the first energy storage and/or the second energy storage according to a first charge rate of the first energy storage.

According to a fourth aspect of the present invention, a power transmission method for a motive power system including a first energy storage, a second energy storage, an actuator, an internal combustion engine, and a power transmission circuit, includes controlling the internal combustion engine and the power transmission circuit to drive a load selectively in a charge-depleting mode or in a charge-sustaining mode, at least the actuator driving the load in the charge-depleting mode using a first energy supplied from the first energy storage and/or the second energy storage according to a second charge rate of the second energy storage, at least the internal combustion engine driving the load in the charge-sustaining mode using a second energy that is lower than the first energy and that is supplied to the actuator from the first energy storage and/or the second energy storage according to a first charge rate of the first energy storage.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
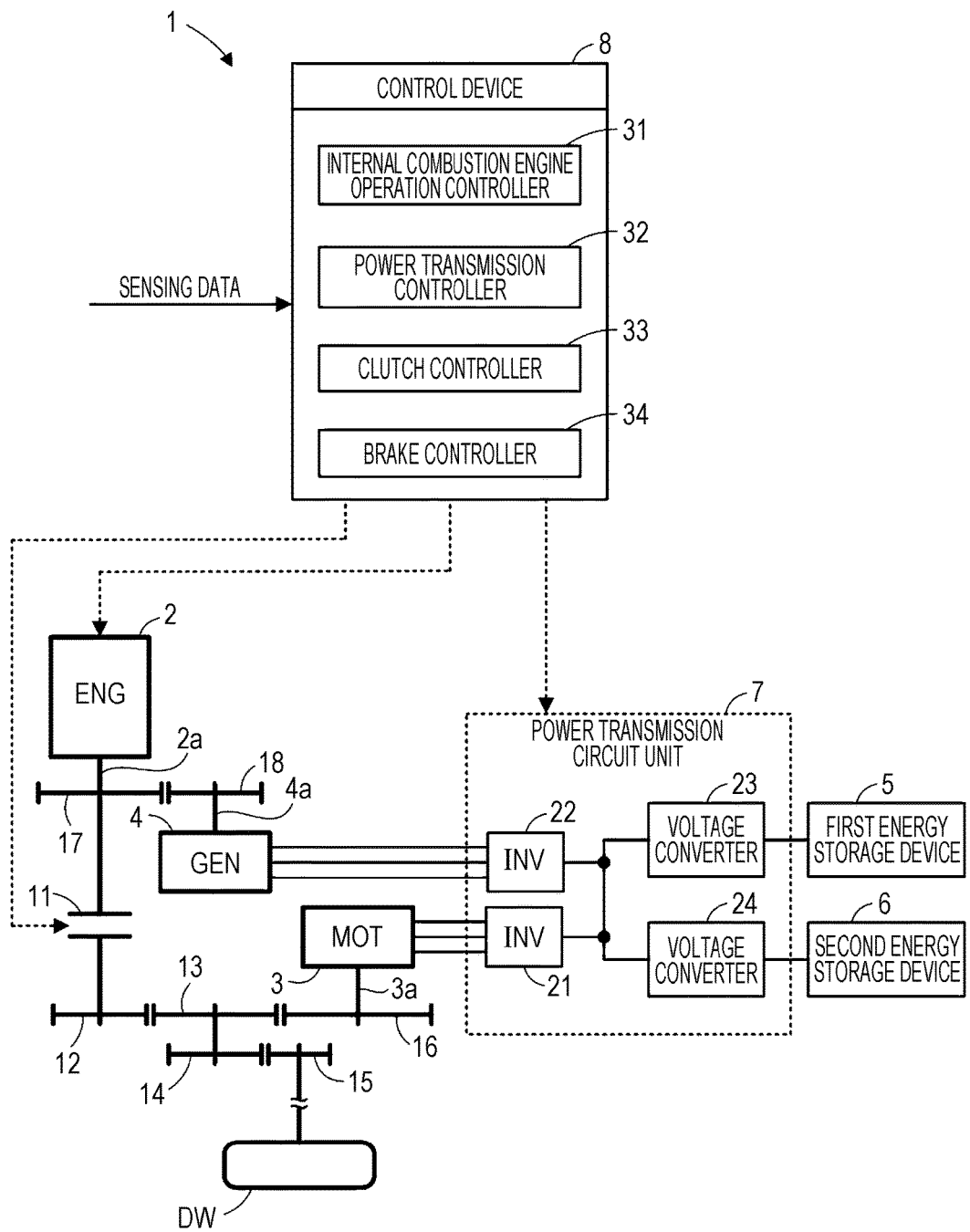
FIG. 1 illustrates an overall configuration of a motive power system according to an embodiment disclosed herein.

The embodiments will now be described with reference to the accompanying drawings, wherein like reference numerals designate corresponding or identical elements throughout the various drawings.

An embodiment of the present disclosure will be described hereinafter with reference to FIGS. 1 to 20. Referring to FIG. 1, a motive power system 1 according to this embodiment is a system mounted in a vehicle (specifically, a hybrid vehicle) that is an example of a transportation apparatus.

The motive power system 1 includes an internal combustion engine 2, an electric motor 3, an electric generator 4, a first energy storage device 5, a second energy storage device 6, a power transmission circuit unit 7, and a control device 8. The internal combustion engine 2 and the electric motor 3 are capable of generating motive power for driving a drive wheel DW, which serves as a target load, to rotate. The first energy storage device 5 and the second energy storage device 6 serve as power supplies for the electric motor 3. The power transmission circuit unit 7 performs power transmission among the electric motor 3, the electric generator 4, the first energy storage device 5, and the second energy storage device 6. The control device 8 has a function of controlling the operation of the motive power system 1.

The internal combustion engine 2 transmits motive power generated by combustion of a fuel to the drive wheel DW via an appropriate powertrain to drive the drive wheel DW to rotate. The powertrain in the motive power system 1 in the illustrated example is configured to transmit motive power generated by the internal combustion engine 2 from an output shaft 2a of the internal combustion engine 2 to the drive wheel DW via a clutch 11 and gears 12, 13, 14, and 15 in sequence. The clutch 11 can selectively operate between a connected state that enables transmission of motive power and a disconnected state that disables transmission of motive power.

The electric motor 3 corresponds to an actuator in the present disclosure. The electric motor 3 transmits motive power generated through the power-running operation of the electric motor 3, which is supplied with electric power, to the drive wheel DW via an appropriate powertrain to drive the drive wheel DW to rotate. The powertrain in the motive power system 1 in the illustrated example is configured to transmit motive power generated by the electric motor 3 from an output shaft 3a of the electric motor 3 to the drive wheel DW via gears 16, 13, 14, and 15 in sequence.

The electric motor 3 is also capable of performing, in addition to the power-running operation, a regenerative operation for outputting regenerative power by using the kinetic energy of the vehicle which is transmitted from the drive wheel DW.

While a single drive wheel DW is illustrated in FIG. 1 as a representative example, a plurality of drive wheels DW are present and motive power is transmitted from the internal combustion engine 2 or the electric motor 3 to the plurality of drive wheels DW via a powertrain that includes a differential gear apparatus (not illustrated).

The electric generator 4 is an electric generator that is capable of outputting generated power by driving a rotating shaft 4a of the electric generator 4 to rotate by using the motive power of the internal combustion engine 2. The rotating shaft 4a of the electric generator 4 is connected to the output shaft 2a of the internal combustion engine 2 via an appropriate powertrain so as to rotate in association with the output shaft 2a of the internal combustion engine 2. The powertrain in the motive power system 1 in the illustrated example is configured to transmit motive power between the output shaft 2a and the rotating shaft 4a via two gears 17 and 18, for example.

In this embodiment, the electric generator 4 also has a function of an actuator (starter motor) for starting the internal combustion engine 2 in addition to the function of an electric generator. That is, electric power is supplied to the electric generator 4 to allow the electric generator 4 to operate as an electric motor. The motive power of the electric generator 4, which serves as an electric motor, is transmitted from the rotating shaft 4a to the output shaft 2a of the internal combustion engine 2, thereby driving the output shaft 2a to rotate.

For additional explanation, the powertrain between the internal combustion engine 2 or the electric motor 3 and the drive wheel DW and the powertrain between the internal combustion engine 2 and the electric generator 4 are not limited to those having the configuration exemplified in FIG. 1 and various configurations are available.

These powertrains may include, for example, components other than gears for transmitting motive power, for example, pulleys and belts or sprockets and chains, and may also include gearboxes.

The output shaft 3a of the electric motor 3 may be coupled coaxially directly to or integrated with any rotating shaft in the powertrain between the clutch 11 and the drive wheel DW, for example.

The powertrain between the electric motor 3 and the drive wheel DW or the powertrain between the internal combustion engine 2 and the electric generator 4 may include a clutch.

The motive power system 1 may include, besides the electric generator 4, an actuator for starting the internal combustion engine 2.

The first energy storage device 5 and the second energy storage device 6 are energy storage devices that are chargeable by an external power supply through a charging device (not illustrated) included in the vehicle. The first energy storage device 5 and the second energy storage device 6 have different characteristics.

Specifically, the first energy storage device 5 is an energy storage device having a higher energy density than the second energy storage device 6. The energy density is an amount of electrical energy that can be stored per unit weight or unit volume. The first energy storage device 5 may be formed of, for example, a lithium-ion battery.

The second energy storage device 6 is an energy storage device having a higher power density than the first energy storage device 5. The power density is an amount of electricity that can be output per unit weight or unit volume (an amount of electrical energy per unit time or an amount of electric charge per unit time). The second energy storage device 6 may be formed of, for example, a lithium-ion battery, a nickel-hydrogen battery, or a capacitor.

The first energy storage device 5 with relatively high energy density is capable of storing a greater amount of electrical energy than the second energy storage device 6. The first energy storage device 5 has a characteristic in which the progression of deterioration of the first energy storage device 5 is suppressed when the first energy storage device 5 is steadily discharged in such a manner that a change in output is less likely to occur, compared with when the first energy storage device 5 is discharged in such a manner that a change in output frequently occurs.

In addition, the first energy storage device 5 has lower resistance to deterioration caused by charging (in particular, high-rate charging) than the second energy storage device 6 (i.e., deterioration of the first energy storage device 5 caused by charging is more likely to progress than that of the second energy storage device 6).

The second energy storage device 6 with relatively high power density has lower internal resistance (impedance) than the first energy storage device 5, and is thus able to instantaneously output high power. The second energy storage device 6 has a characteristic in which the progression of deterioration of the second energy storage device 6 is suppressed when the second energy storage device 6 is discharged or charged with the charge rate kept within an approximately middle range, compared with when the second energy storage device 6 is discharged or charged with the charge rate biased toward the high-capacity side or the low-capacity side. More specifically, the second energy storage device 6 has a characteristic in which the more the charge rate increases or decreases toward the high-capacity side or the low-capacity side with respect to the approximately middle range, the more likely the progression of deterioration of the second energy storage device 6 is to occur.

The charge rate of each of the energy storage devices 5 and 6 is the ratio of the remaining capacity to the full charge capacity. In the following, the charge rate is sometimes referred to as SOC (state of charge). In addition, the SOC of the first energy storage device 5 is sometimes referred to as the first SOC and the SOC of the second energy storage device 6 as the second SOC.

In this embodiment, the power transmission circuit unit 7 includes inverters 21 and 22 and voltage converters 23 and 24. The inverter 21 is connected to the electric motor 3, and the inverter 22 is connected to the electric generator 4. The voltage converter 23 is connected to the first energy storage device 5, and the voltage converter 24 is connected to the second energy storage device 6.

The inverters 21 and 22 are known circuits each having a switching element that is controlled by a duty signal to convert electric power from one of direct-current (DC) power and alternating-current (AC) power to the other.

The inverter 21 on the electric motor 3 side is capable of performing control to, during the power-running operation of the electric motor 3, convert DC power input from the voltage converter 23 or 24 into AC power and output the AC power to the electric motor 3, and is also capable of performing control to, during the regenerative operation of the electric motor 3, convert AC power (regenerative power) input from the electric motor 3 into DC power and output the DC power to the voltage converter 23 or 24.

The inverter 22 on the electric generator 4 side is capable of performing control to, during the power generation operation of the electric generator 4, convert AC power (generated power) input from the electric generator 4 into DC power and output the DC power to the voltage converter 23 or 24, and is also capable of performing control to, when the electric generator 4 is caused to operate as an actuator for starting the internal combustion engine 2, convert DC power input from the voltage converter 23 or 24 into AC power and output the AC power to the electric generator 4.

The voltage converters 23 and 24 are known circuits (switching-type DC/DC converters) each having a switching element that is controlled by a duty signal to convert (boost or step down) the voltage of the DC power. Each of the voltage converters 23 and 24 is capable of variably controlling the voltage conversion ratio (boosting ratio or step-down ratio), and is also capable of performing bidirectional power transmission (power transmission during the discharging of the corresponding one of the energy storage devices 5 and 6 and power transmission during the charging of the corresponding one of the energy storage devices 5 and 6).

The control device 8 is implemented as an electronic circuit unit that includes a central processing unit (CPU), a random access memory (RAM), a read-only memory (ROM), an interface circuit, and so on. The control device 8 may be constituted by a plurality of electronic circuit units that are capable of communicating with each other.

The control device 8 includes functions implemented by a hardware configuration to be mounted therein or by a program (software configuration) to be installed therein, namely, an internal combustion engine operation controller 31, a power transmission controller 32, a clutch controller 33, and a brake controller 34. The internal combustion engine operation controller 31 controls the operation of the internal combustion engine 2. The power transmission controller 32 controls the power transmission circuit unit 7 (and accordingly controls the operation of the electric motor 3 and the electric generator 4). The clutch controller 33 controls switching between operating states of the clutch 11. The brake controller 34 controls a brake device (not illustrated) of the vehicle.

The control device 8 receives input of various sensing data as information necessary to implement the functions described above. The sensing data includes, for example, data indicating the amount of operation of the accelerator pedal of the vehicle, the amount of operation of the brake pedal of the vehicle, the vehicle speed, the rotational speed of the output shaft 2a of the internal combustion engine 2, the rotational speed of the output shaft 3a of the electric motor 3, the rotational speed of the rotating shaft 4a of the electric generator 4, and the respective detected values of the first SOC and the second SOC.

The control device 8 may include a function of an SOC detector that detects (estimates) the first SOC and the second SOC. In this case, the control device 8 receives input of sensing data for estimating the first SOC and the second SOC (for example, data indicating detected values of the voltage, current, temperature, and the like of the energy storage devices 5 and 6) instead of sensing data indicating the respective detected values of the first SOC and the second SOC.

A specific description will now be given of a control process for the control device 8.

Overview of Control Process for Control Device 8

First, a description will be given of an overview of a control process executed by the control device 8. The control process executed by the control device 8 is broadly categorized into two types: a control process for a charge-depleting (CD) mode and a control process for a charge-sustaining (CS) mode. The CD mode and the CS mode represent operation types of the motive power system 1 when the vehicle is traveling.

The CD mode is a mode in which at least the motive power of the electric motor 3 is usable as motive power for driving the drive wheel DW (as motive power for propelling the vehicle) so that the total stored energy of the first energy storage device 5 and the second energy storage device 6 is consumed.

In this embodiment, the CD mode is a mode in which only the motive power of the electric motor 3, out of the internal combustion engine 2 and the electric motor 3, is usable as motive power for driving the drive wheel DW.

In the CD mode in this embodiment, the stored energy of the first energy storage device 5, out of the first energy storage device 5 and the second energy storage device 6, is used as the main power supply energy for the electric motor 3 to perform the power-running operation of the electric motor 3.

For additional explanation, in the CD mode in this embodiment, the internal combustion engine 2 remains at rest (the operation of the internal combustion engine 2 is prohibited).

The CS mode is a mode in which at least the motive power of the internal combustion engine 2 is usable as motive power for driving the drive wheel DW (as motive power for propelling the vehicle) so that the total stored energy of the first energy storage device 5 and the second energy storage device 6 is less consumed than in the CD mode.

In this embodiment, the CS mode is a mode in which the motive power of the internal combustion engine 2 and the motive power of the electric motor 3 are usable as motive power for driving the drive wheel DW. More specifically, the CS mode is a mode in which the motive power of the internal combustion engine 2 is usable as main motive power for driving the drive wheel DW and the motive power of the electric motor 3 is usable as auxiliary motive power for driving the drive wheel DW.

The CS mode in this embodiment is divided into a first CS mode and a second CS mode. In the first CS mode, the electric power in the second energy storage device 6, out of the first energy storage device 5 and the second energy storage device 6, is used as main power supply energy for the power-running operation of the electric motor 3 and the electric power in the second energy storage device 6 is provided (transferred) to charge the first energy storage device 5, if necessary, to gradually restore the SOC of the first energy storage device 5 (i.e., the first SOC). In the second CS mode, the electric power in the first energy storage device 5, out of the first energy storage device 5 and the second energy storage device 6, is used as main power supply energy for the power-running operation of the electric motor 3 and the second energy storage device 6 is charged with the generated power of the electric generator 4 to restore the SOC of the second energy storage device 6 (i.e., the second SOC).

The control process in the first CS mode and the control process in the second CS mode are alternately executed with the total charge and discharge of the first energy storage device 5 and the second energy storage device 6 being kept in balance as appropriate. In addition, when the SOC of the first energy storage device 5 is restored to some extent as a result of repeating the control process in the first CS mode and the control process in the second CS mode or as a result of plug-in charging using an external electric power system, the mode of the control process is returned from the CS mode to the CD mode.

A pattern indicating how the respective stored energies of the first energy storage device 5 and the second energy storage device 6 are used in this embodiment will now be described with reference to FIG. 2.

Figure 2:
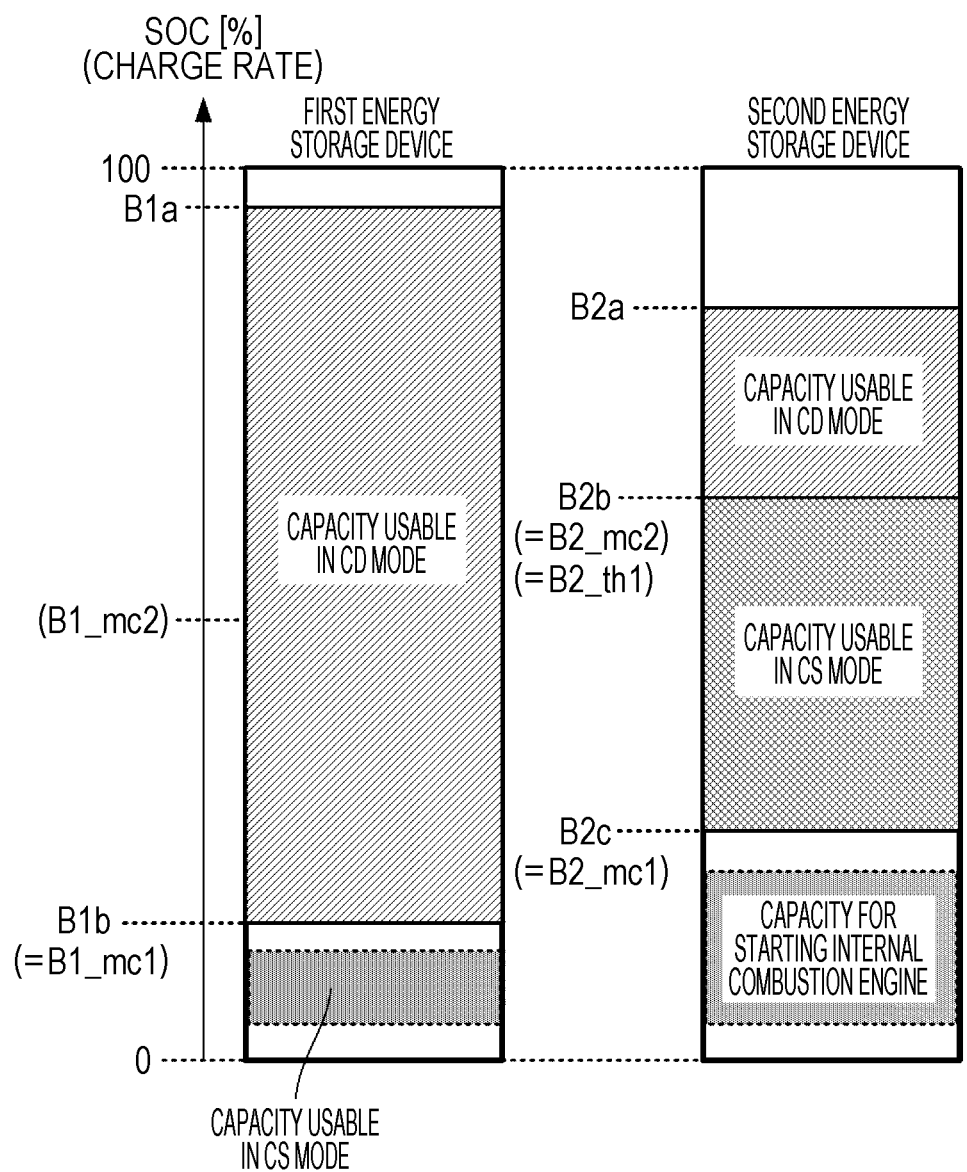
FIG. 2 conceptually illustrates how the respective capacities of a first energy storage device and a second energy storage device are allocated for use.
Figure 3:
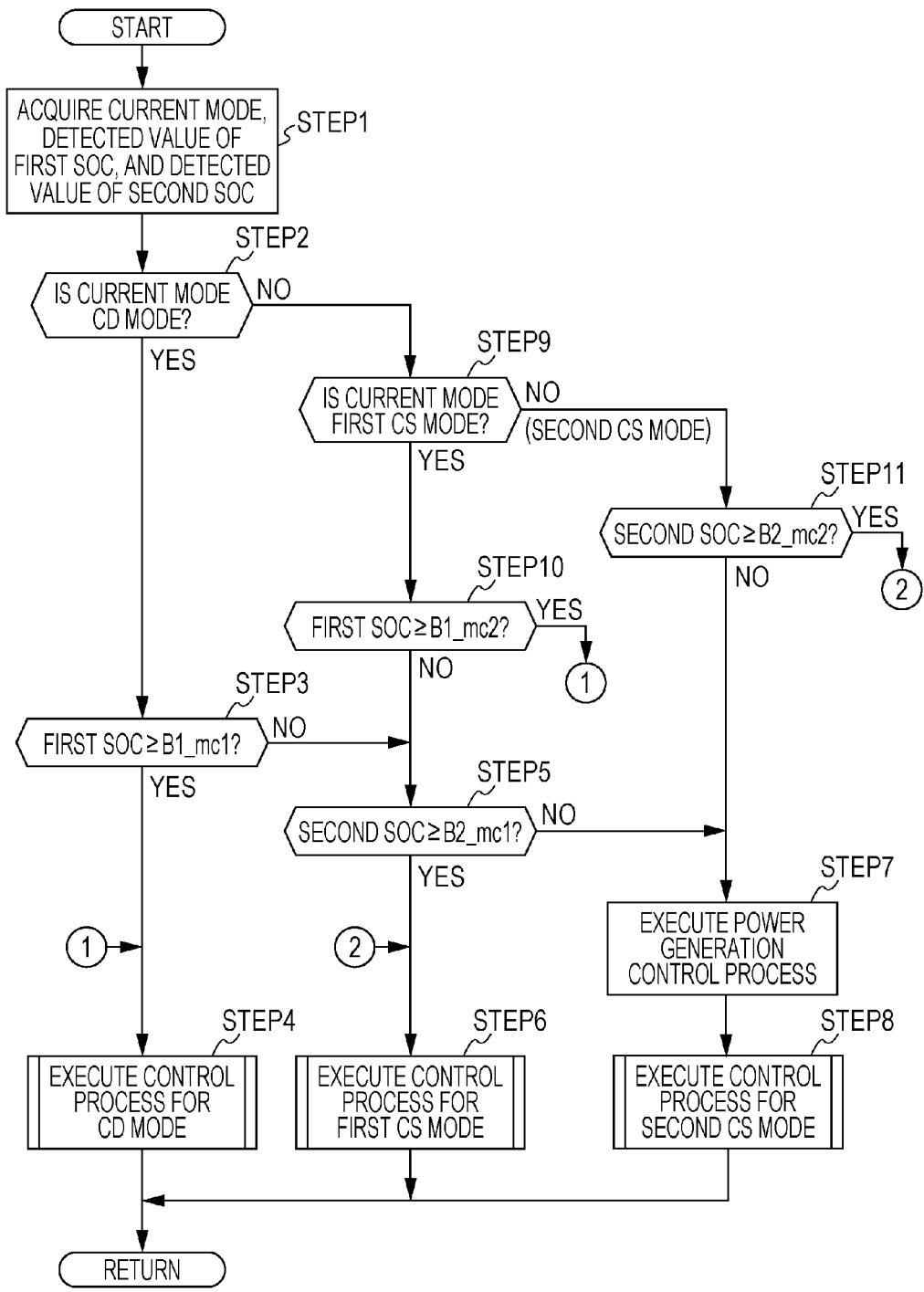
FIG. 3 is a flowchart illustrating a main routine process executed by a control device.

In this embodiment, as depicted in a left percentage bar chart in FIG. 2, a capacity (stored energy) in a range less than or equal to B1$a$ (%) out of the full charge capacity (100% SOC) of the first energy storage device 5 is allocated as a capacity that can be used to supply power to the electric motor 3. B1$a$ (%) is set to represent a charge rate slightly less than 100% with consideration given to a detection error of the first SOC, an error of charge control, or the like.

A capacity in a range of B1$a$ (%) to B1$b$ (%) is allocated as a capacity used to supply power to the electric motor 3 in the CD mode, and a range less than or equal to B1$b$ (%) is allocated as a range that includes a capacity that can be used as an auxiliary to supply power to the electric motor 3 in the CS mode. B1$b$ (%) is set to represent an SOC close to 0%.

The range less than or equal to B1$b$ (%) includes, in addition to the capacity that can be used to supply power to the electric motor 3 in the CS mode, margins that are defined by taking into account a detection error of the first SOC or the like.

In this manner, a range that occupies a large proportion (the range of B1$a$ (%) to B1$b$ (%)) of the full charge capacity of the first energy storage device 5 is allocated as a capacity used to supply power to the electric motor 3 in the CD mode.

In this embodiment, as depicted in a right percentage bar chart in FIG. 2, a capacity in a range of B2$a$ (%) to B2$b$ (%) out of the full charge capacity (100% SOC) of the second energy storage device 6 is allocated as a dedicated capacity that can be used to supply power to the electric motor 3 in the CD mode, and a capacity in a range of B2$b$ (%) to B2$c$ (%) is allocated as a capacity that can be used to supply power to the electric motor 3 in the CS mode.

In this embodiment, part of the capacity in the range of B2$b$ (%) to B2$c$ (%) can also be used in the CD mode. Note that the capacity in the range of B2$b$ (%) to B2$c$ (%) is a capacity which can temporarily be used in the CD mode and, after a capacity has been used to supply power to the electric motor 3, the second energy storage device 6 can basically be replenished from the first energy storage device 5 by an amount corresponding to the capacity used.

To minimize the progression of deterioration of the second energy storage device 6, it is preferable to discharge or charge the second energy storage device 6 when the second SOC is an SOC near an intermediate value. Accordingly, B2$b$ (%) is set to approximately an intermediate SOC, B2$a$ (%) is set to a value larger than B2$b$ (%) to such an extent that B2$a$ (%) is not too close to 100%, and B2$c$ (%) is set to a value smaller than B2$b$ (%) to such an extent that B2$c$ (%) is not too close to 0%.

A range less than or equal to B2$c$ (%) is allocated as a range that includes electric power for starting the internal combustion engine 2 (electric power that can be used to supply power to the electric generator 4 serving as a starter actuator.

In this embodiment, power is supplied from the second energy storage device 6 to the electric generator 4 at the start of the internal combustion engine 2, and the electric power in the first energy storage device 5 is not used to supply power to the electric generator 4. Thus, there is no need for the first energy storage device 5 to reserve electric power for starting the internal combustion engine 2.

As a result, the SOC range of the first energy storage device 5 which is allocated as a capacity range used to supply power to the electric motor 3 in the CD mode can be increased. That is, in the CD mode in which fuel consumption of the internal combustion engine 2 does not occur or is reduced, the drivable range of the vehicle is increased and the environmental performance of the motive power system 1 is improved. Additionally, instantaneous power supply to the starter actuator (in this embodiment, the electric generator 4), which is required to start the internal combustion engine 2, is undertaken by the second energy storage device 6. This can favorably suppress the progression of deterioration of the first energy storage device 5.

As illustrated in FIG. 2, in the CD mode, the SOC range (of B1$a$ (%) to B1$b$ (%)) of the first energy storage device 5, which can be used to supply power to the electric motor 3, is larger than the SOC range (of B2$a$ (%) to B2$b$ (%)) of the second energy storage device 6, which can be used to supply power to the electric motor 3.

Thus, in the CD mode, the electric power in the first energy storage device 5 can be mainly used to perform the power-running operation of the electric motor 3. In addition, the electric power in the second energy storage device 6 can also be used as an auxiliary, if necessary, to perform the power-running operation of the electric motor 3.

In particular, there is no need for the first energy storage device 5 to reserve electric power for starting the internal combustion engine 2. This makes it possible to maximize the SOC range (of B1$a$ (%) to B1$b$ (%)) that can be used to supply power to the electric motor 3 in the CD mode.

As a result, in the CD mode in which only the motive power of the electric motor 3 is used to propel the vehicle, the period during which power can be continuously supplied to the electric motor 3, and accordingly the drivable range of the vehicle in the CD mode in which fuel consumption of the internal combustion engine 2 does not occur or is reduced, can be maximized and the environmental performance of the vehicle can be improved.

In the CS mode, in contrast, as illustrated in FIG. 2, the SOC range (of B2$b$ (%) to B2$c$ (%)) of the second energy storage device 6, which can be used to supply power to the electric motor 3, is larger than the SOC range (part of the range less than or equal to B1$b$ (%)) of the first energy storage device 5, which can be used to supply power to the electric motor 3.

Thus, in the CS mode, motive power that gives support to the motive power of the internal combustion engine 2 to drive the drive wheel DW (propel the vehicle) can be generated quickly (with high responsivity) mainly by power supply from the second energy storage device 6, which is of the high-power type, to the electric motor 3.

Accordingly, when the motive power system 1 outputs a high driving force to the drive wheel DW, the electric motor 3 outputs auxiliary motive power by power supply from the second energy storage device 6. This enables not only suppression of excessive fuel consumption of the internal combustion engine 2 but also reduction in the displacement of the internal combustion engine 2.

In addition, since the second energy storage device 6 has a higher power density than the first energy storage device 5, the resistance of the second energy storage device 6 to charge or discharge for which high responsivity is required is superior to that of the first energy storage device 5. Thus, deterioration of the first energy storage device 5 can further be suppressed.

Main Routine Process

On the basis of the foregoing, a detailed description will be given of the control process for the control device 8. The control device 8 sequentially executes a main routine process illustrated in a flowchart in FIG. 3 in a predetermined control process cycle after the vehicle has been started.

In STEP1, the control device 8 acquires the current mode of the control process, a detected value of the SOC of the first energy storage device 5 (i.e., the first SOC), and a detected value of the SOC of the second energy storage device 6 (i.e., the second SOC).

If the first energy storage device 5 is charged up to the fully-charged level (or up to an SOC greater than or equal to a CS→CD switching threshold $B1\_mc2$ described below) while the vehicle is not in operation before the vehicle is started, the initial mode of the control process after the start of the vehicle is the CD mode. If the first energy storage device 5 is not charged when the vehicle is not in operation before the vehicle is started, the initial mode of the control process after the start of the vehicle is the same mode as the mode set at the end of the previous driving operation of the vehicle.

Then, in STEP2, the control device 8 determines whether or not the current mode of the control process is the CD mode. If the determination result of STEP2 is affirmative, in STEP3, the control device 8 further determines whether or not the detected value of the first SOC is greater than or equal to a predetermined mode switching threshold $B1\_mc1$. The mode switching threshold $B1\_mc1$ is a threshold that defines whether or not to perform switching from the CD mode to the CS mode, and is hereinafter referred to as the CD→CS switching threshold $B1\_mc1$. In this embodiment, the CD→CS switching threshold $B1\_mc1$ is set to $B1b$ (%) illustrated in FIG. 2.

If the determination result of STEP3 is affirmative, in STEP4, the control device 8 selects the CD mode as the mode of the control process and executes a control process for the CD mode (described in detail below). In this case, the control process for the CD mode is continuously executed.

If the determination result of STEP3 is negative, then, in STEP5, the control device 8 determines whether or not the detected value of the second SOC is greater than or equal to a mode switching threshold $B2\_mc1$. The mode switching threshold $B2\_mc1$ is a threshold that defines whether or not to perform switching from the first CS mode to the second CS mode, and is hereinafter referred to as the CS1→CS2 switching threshold $B2\_mc1$. In this embodiment, the CS1→CS2 switching threshold $B2\_mc1$ is set to $B2c$ (%) illustrated in FIG. 2.

If the determination result of STEP5 is affirmative, in STEP6, the control device 8 selects the first CS mode as the mode of the control process and executes a control process for the first CS mode (described in detail below). Thus, the mode of the control process is switched from the CD mode to the first CS mode.

If the determination result of STEP5 is negative, in STEP7, the control device 8 executes a power generation control process for performing a power generation operation of the electric generator 4.

In the power generation control process, the control device 8 instructs the internal combustion engine operation controller 31 and the power transmission controller 32 to perform a power generation operation of the electric generator 4.

In this case, the internal combustion engine operation controller 31 controls the internal combustion engine 2 to output, from the internal combustion engine 2, motive power to which motive power for driving the electric generator 4 is added. The power transmission controller 32 controls the power transmission circuit unit 7 to preferentially charge the second energy storage device 6, out of the first energy storage device 5 and the second energy storage device 6, with generated power that is produced by the electric generator 4 by using the motive power of the internal combustion engine 2. Specifically, the power transmission controller 32 controls the voltage converter 24 and the inverter 22 of the power transmission circuit unit 7 to charge only the second energy storage device 6 with the generated power, except for the case where the detected value of the first SOC is smaller than a predetermined value (e.g., a threshold $B1\_th1$ described below (see FIG. 11)).

If the detected value of the first SOC is smaller than the predetermined value and while power supply to the electric motor 3 is halted, the power transmission controller 32 controls the voltage converters 23 and 24 and the inverter 22 of the power transmission circuit unit 7 to charge both the first energy storage device 5 and the second energy storage device 6 with the generated power. In this case, the amount of generated power with which the first energy storage device 5 is charged is limited to an amount of charge at low rates (low speeds) to suppress the progression of deterioration of the first energy storage device 5.

Thus, the second energy storage device 6 is preferentially charged with the generated power. If the charge rate of the first energy storage device 5 is low, the first energy storage device 5 is appropriately charged with part of the generated power at a low rate.

Note that when the determination result of STEP5 is negative, the internal combustion engine 2 is not always in operation and, in some cases, the operation of the internal combustion engine 2 has not yet been started. In this case, the control device 8 instructs the internal combustion engine operation controller 31 and the power transmission controller 32 to perform a power generation operation of the electric generator 4 after the internal combustion engine 2 has been started.

In the process for starting the internal combustion engine 2, the power transmission circuit unit 7 controls the voltage converter 24 on the second energy storage device 6 side and the inverter 22 on the electric generator 4 side to supply power from the second energy storage device 6 to the electric generator 4 (and to therefore cause the electric generator 4 to operate as a starter motor). This allows the output shaft $2a$ of the internal combustion engine 2 to be driven to rotate by the motive power of the electric generator 4 serving as a starter actuator (starter motor). In this embodiment, therefore, power is supplied from the second energy storage device 6 to the electric generator 4 (starter motor) at the start of the internal combustion engine 2.

Since instantaneous power supply to the starter actuator (the electric generator 4), which is required to start the internal combustion engine 2, is undertaken by the second energy storage device 6, the progression of deterioration of the first energy storage device 5 can be favorably suppressed.

Then, the internal combustion engine operation controller 31 supplies fuel to the internal combustion engine 2 in synchronization with the rotation of the output shaft 2a of the internal combustion engine 2 to start the combustion operation of the internal combustion engine 2. Thereafter, the internal combustion engine operation controller 31 and the power transmission controller 32 execute the control process described above for performing a power generation operation of the electric generator 4, thereby starting the power generation operation of the electric generator 4 and starting charging the second energy storage device 6 with the generated power.

After the power generation control process in STEP7, in STEP8, the control device 8 selects the second CS mode as the mode of the control process and executes a control process for the second CS mode (described in detail below). Thus, the mode of the control process is switched from the CD mode to the second CS mode.

For additional explanation, in the second CS mode, the charging of the second energy storage device 6 through the power generation operation of the electric generator 4 is interrupted during the regenerative operation of the electric motor 3. In this case, the inverter 22 of the power transmission circuit unit 7 is controlled so that the energization of the inverter 22 is interrupted. Note that charging of the second energy storage device 6 with the regenerative power of the electric motor 3 and charging of the second energy storage device 6 with the generated power of the electric generator 4 may be performed in parallel.

If the determination result of STEP2 is negative, then, in STEP9, the control device 8 determines whether or not the current mode of the control process is the first CS mode.

If the determination result of STEP9 is affirmative, in STEP10, the control device 8 further determines whether or not the detected value of the first SOC is greater than or equal to a predetermined mode switching threshold B1_mc2. The mode switching threshold B1_mc2 is a threshold that defines whether or not to perform switching from the CS mode to the CD mode, and is hereinafter referred to as the CS→CD switching threshold B1_mc2. In this embodiment, the CS→CD switching threshold B1_mc2 is set to a value higher than the mode switching threshold B1_mc1 in STEP3 to provide hysteresis for switching between the first CS mode and the second CS mode, and is set to, for example, a value between B1$b$ (%) and B1$a$ (%) illustrated in FIG. 2.

If the determination result of STEP10 is affirmative, in STEP4, the control device 8 selects the CD mode as the mode of the control process and executes the control process for the CD mode. Thus, the mode of the control process is switched from the CS mode (first CS mode) to the CD mode.

If the determination result of STEP10 is negative, the control device 8 executes the process from STEP5 described above. If the determination result of STEP5 is affirmative, the control process for the first CS mode is continuously executed. If the determination result of STEP5 is negative, the mode of the control process is switched from the first CS mode to the second CS mode.

If the determination result of STEP9 is negative, in STEP11, the control device 8 further determines whether or not the detected value of the second SOC is greater than or equal to a predetermined mode switching threshold B2_mc2. The mode switching threshold B2_mc2 is a threshold that defines whether or not to perform switching from the second CS mode to the first CS mode, and is hereinafter referred to as the CS2→CS1 switching threshold B2_mc2. In this embodiment, the CS2→CS1 switching threshold B2_mc2 is set to B2$b$ (%) (>the CS1→CS2 switching threshold B2_mc1) illustrated in FIG. 2.

If the determination result of STEP11 is affirmative, in STEP6, the control device 8 selects the first CS mode as the mode of the control process and executes the control process for the first CS mode. Thus, the mode of the control process is switched from the second CS mode to the first CS mode.

If the determination result of STEP11 is negative, the control device 8 executes the process from STEP7 described above. In this case, through the processing of STEP7 and STEP8, the power generation operation of the electric generator 4 is continuously executed and the control process in the second CS mode is also continuously executed.

As described above, switching between the CD mode and the CS mode is based on the first SOC and switching between the first CS mode and the second CS mode is based on the second SOC.

Control Process for CD Mode

Next, the control process for the CD mode in STEP4 will be described in detail.

The control device 8 determines a required driving force (required propulsion force) or required braking force of the entire vehicle in accordance with the detected value of the amount of operation of the accelerator pedal of the vehicle, the detected value of the amount of operation of the brake pedal of the vehicle, the detected value of the vehicle speed, and so on, and also determines the respective target operating states of the internal combustion engine 2, the electric motor 3, the electric generator 4, the clutch 11, and the brake device.

In the CD mode, the control device 8 maintains the internal combustion engine 2 and the electric generator 4 at rest and also maintains the clutch 11 in the disconnected state.

In a situation where the required driving force of the entire vehicle is not zero (this state is hereinafter referred to as the vehicle driving request state), the control device 8 determines a required output DM_dmd of the electric motor 3 so as to realize the required driving force by using the motive power of the electric motor 3.

Then, as described in detail below, the control device 8 causes the power transmission controller 32 to control the inverter 21 on the electric motor 3 side and the voltage converters 23 and 24 of the power transmission circuit unit 7 to supply power from either or both of the first energy storage device 5 and the second energy storage device 6 to the electric motor 3 in accordance with a pre-created map illustrated in FIG. 4 on the basis of the required output DM_dmd and the detected value of the SOC of the second energy storage device 6 (i.e., the second SOC).

The required output DM_dmd of the electric motor 3, such as a request value of the amount of electrical energy to be supplied to the electric motor 3 per unit time (in other words, a requested electric power value), a driving force to be output from the electric motor 3, a request value of the amount of mechanical output energy per unit time, or a request value of the current to be caused to flow through the electric motor 3, can be used to output motive power (an output torque) that can realize the required driving force of the vehicle from the electric motor 3.

In this embodiment, the request value of the amount of electrical energy to be supplied to the electric motor 3 per unit time is used as an example of the required output DM_dmd of the electric motor 3.

In a situation where the required braking force of the entire vehicle is not zero (this state is hereinafter referred to as the vehicle braking request state), the control device 8 determines the shares of the required braking force that are undertaken by the electric motor 3 and the brake device. In this case, the control device 8 determines the respective shares undertaken by the electric motor 3 and the brake device on the basis of the magnitude of the required braking force, the detected value of the second SOC, and so on so that the share of the required braking force which is undertaken by the electric motor 3 generally becomes as high as possible.

Then, the control device 8 causes the brake controller 34 to control the brake device in accordance with the share of the required braking force that is undertaken by the brake device.

Further, the control device 8 determines a required amount of regeneration G_dmd of the electric motor 3 so that the share of the required braking force which is undertaken by the electric motor 3 is realized by the regenerative braking force generated through the regenerative operation of the electric motor 3.

Figure 9:
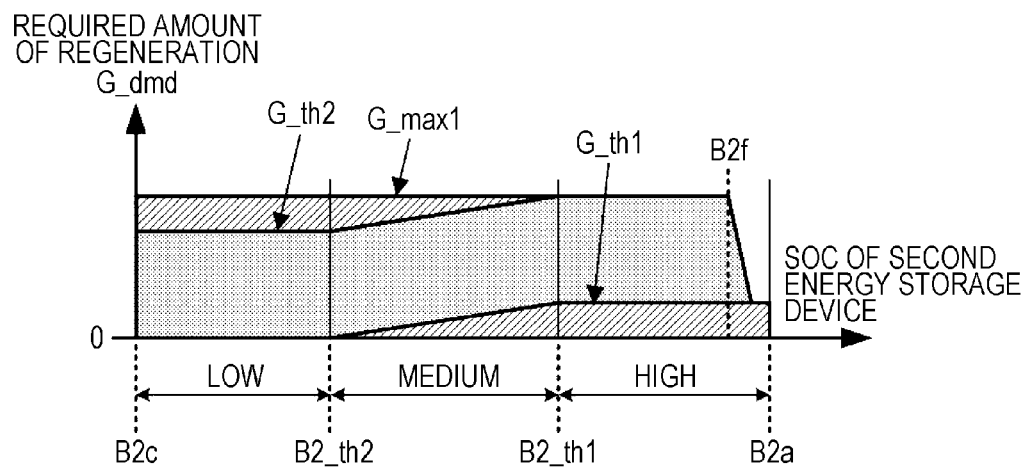
FIG. 9 illustrates a map used in a control process during the regenerative operation of the electric motor in the CD mode.

Then, the control device 8 causes the power transmission controller 32 to control the inverter 21 on the electric motor 3 side and the voltage converters 23 and 24 of the power transmission circuit unit 7 to charge either or both of the first energy storage device 5 and the second energy storage device 6 with the regenerative power output from the electric motor 3 in accordance with a pre-created map illustrated in FIG. 9 on the basis of the required amount of regeneration G_dmd and the detected value of the SOC of the second energy storage device 6 (i.e., the second SOC). In this case, in this embodiment, the main energy storage device to be charged with the regenerative power in the CD mode is the second energy storage device 6.

Examples of the required amount of regeneration G_dmd of the electric motor 3 may include, as the share of the required braking force of the entire vehicle that is undertaken by the electric motor 3, a request value of the regenerative braking force generated by the electric motor 3 through a regenerative operation, a request value of the regenerative power generated by the electric motor 3 through a regenerative operation (the amount of electrical energy generated per unit time), and a request value of the current to be caused to flow through the electric motor 3.

In this embodiment, the request value of the regenerative power is used as an example of the required amount of regeneration G_dmd of the electric motor 3.

Control Process During Power-Running Operation in CD Mode

A control process executed by the power transmission controller 32 during the power-running operation of the electric motor 3 in the CD mode will be described in detail hereinafter with reference to FIGS. 4 to 8.

Figure 4:
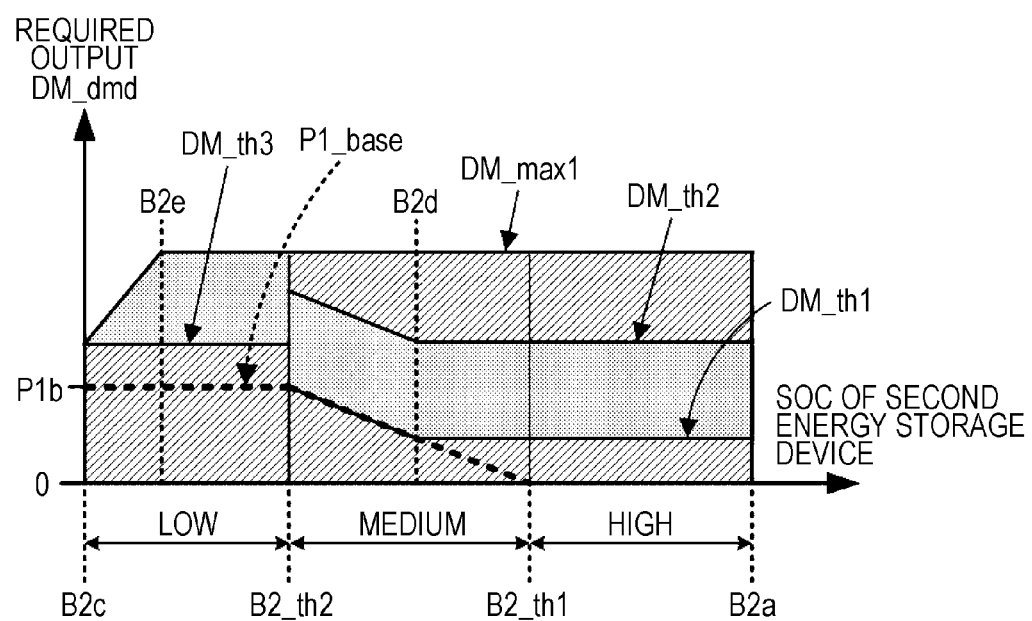
FIG. 4 illustrates a map used in a control process when power is supplied to an electric motor in a charge-depleting (CD) mode.

FIG. 4 illustrates a map depicting how the first energy storage device 5 and the second energy storage device 6 output power to meet the demand for the amount of electricity (the amount of supplied power) to be supplied to the electric motor 3 in accordance with the required output DM_dmd of the electric motor 3 and the second SOC.

In FIG. 4, diagonally hatched areas represent areas where all or part of the amount of supplied power to the electric motor 3 is provided by the first energy storage device 5, and a shaded area represents an area where all or part of the amount of supplied power to the electric motor 3 is provided by the second energy storage device 6.

More specifically, the lower diagonally hatched area represents an area where all the amount of supplied power to the electric motor 3 is provided by only the first energy storage device 5, and the shaded area or the upper diagonally hatched area represents an area where the amount of supplied power to the electric motor 3 is provided by both the first energy storage device 5 and the second energy storage device 6.

On the map illustrated in FIG. 4, DM_max1 is a maximum value of the required output DM_dmd in the CD mode. The maximum value DM_max1 is a constant value when the second SOC is an SOC greater than or equal to a predetermined value B2e. When the second SOC is smaller than the value B2e, the maximum value DM_max1 decreases in accordance with the decrease in the second SOC.

In the control process during the power-running operation of the electric motor 3 in the CD mode, as illustrated in FIG. 4, the first energy storage device 5 and the second energy storage device 6 output power in proportions which differ depending on whether the value of the second SOC falls within a high-SOC area (high-remaining-capacity area), a medium-SOC area (medium-remaining-capacity area), or a low-SOC area (low-remaining-capacity area) in the above-described range where the second energy storage device 6 is used (within the range of B2a to B2c illustrated in FIG. 2). The high-SOC area is an area where SOC≥B2_th1 is satisfied. The medium-SOC area is an area where B2_th1>SOC≥B2_th2 is satisfied. The low-SOC area is an area where B2_th2>SOC is satisfied.

On the map illustrated in FIG. 4, the thresholds B2_th1 and B2_th2 by which the second SOC is separated are thresholds (fixed values) determined in advance for the CD mode. The thresholds B2_th1 and B2_th2 are set in advance based on experiments or the like so that the medium-SOC area whose range is determined by the thresholds B2_th1 and B2_th2 is an SOC area within which the actual value of the second SOC preferably falls to minimize the progression of deterioration of the second energy storage device 6. Accordingly, the medium-SOC area is an area within which the progression of deterioration of the second energy storage device 6 can be favorably suppressed when the second energy storage device 6 is charged or discharged with the actual value of the second SOC being kept within the medium-SOC area as much as possible.

In this embodiment, the control process in the CD mode is performed with the second SOC being kept within the medium-SOC as much as possible to suppress the progression of deterioration of the second energy storage device 6.

In this embodiment, the threshold B2_th1, which is the lower limit of the high-SOC area, matches B2b (%) illustrated in FIG. 2. Accordingly, within the capacity of the second energy storage device 6, a capacity (stored energy) in the range of the high-SOC area is a capacity that can exclusively be used in the CD mode.

Figure 5:
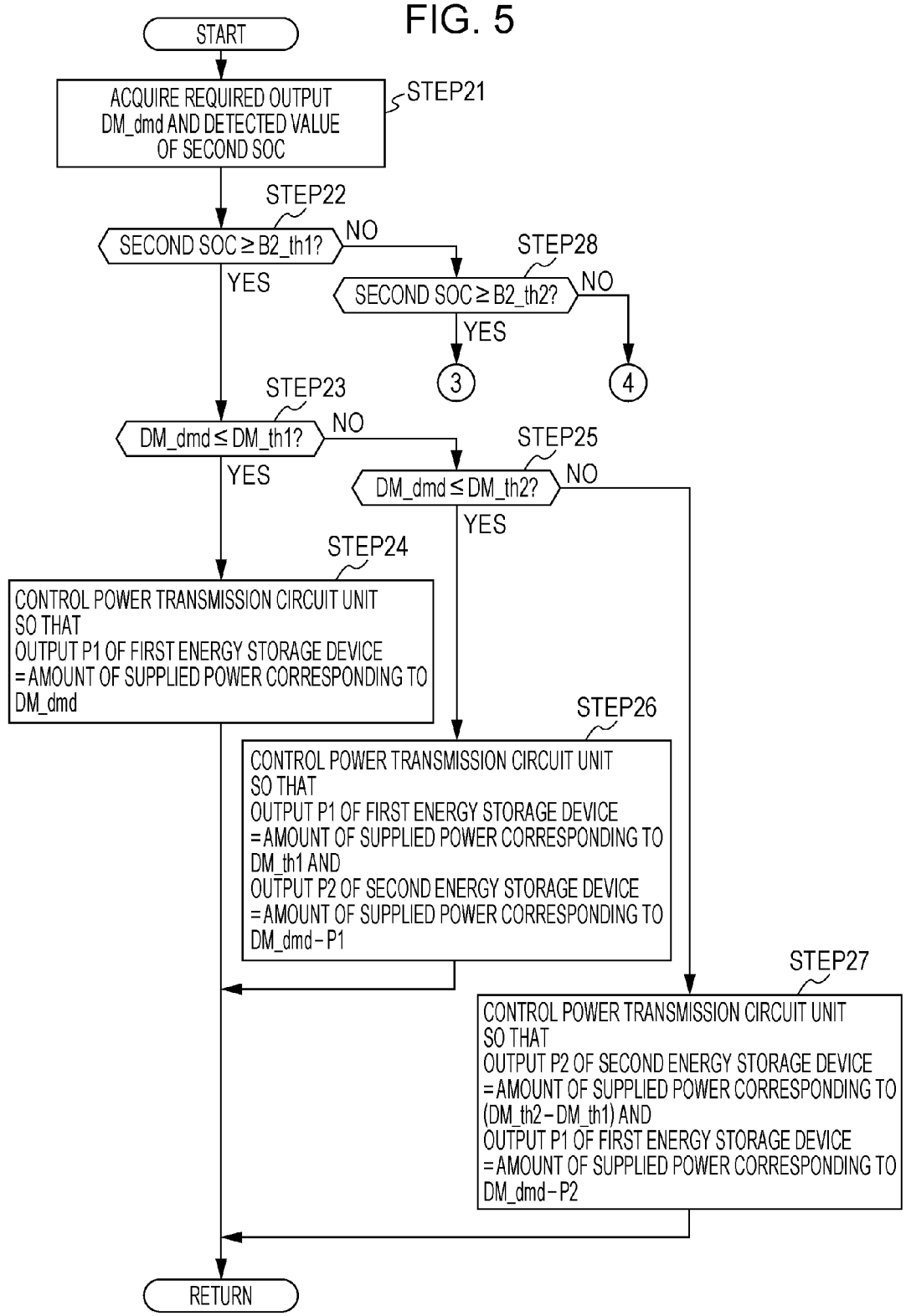
FIG. 5 is a flowchart illustrating the control process when power is supplied to the electric motor in the CD mode.
Figure 6:
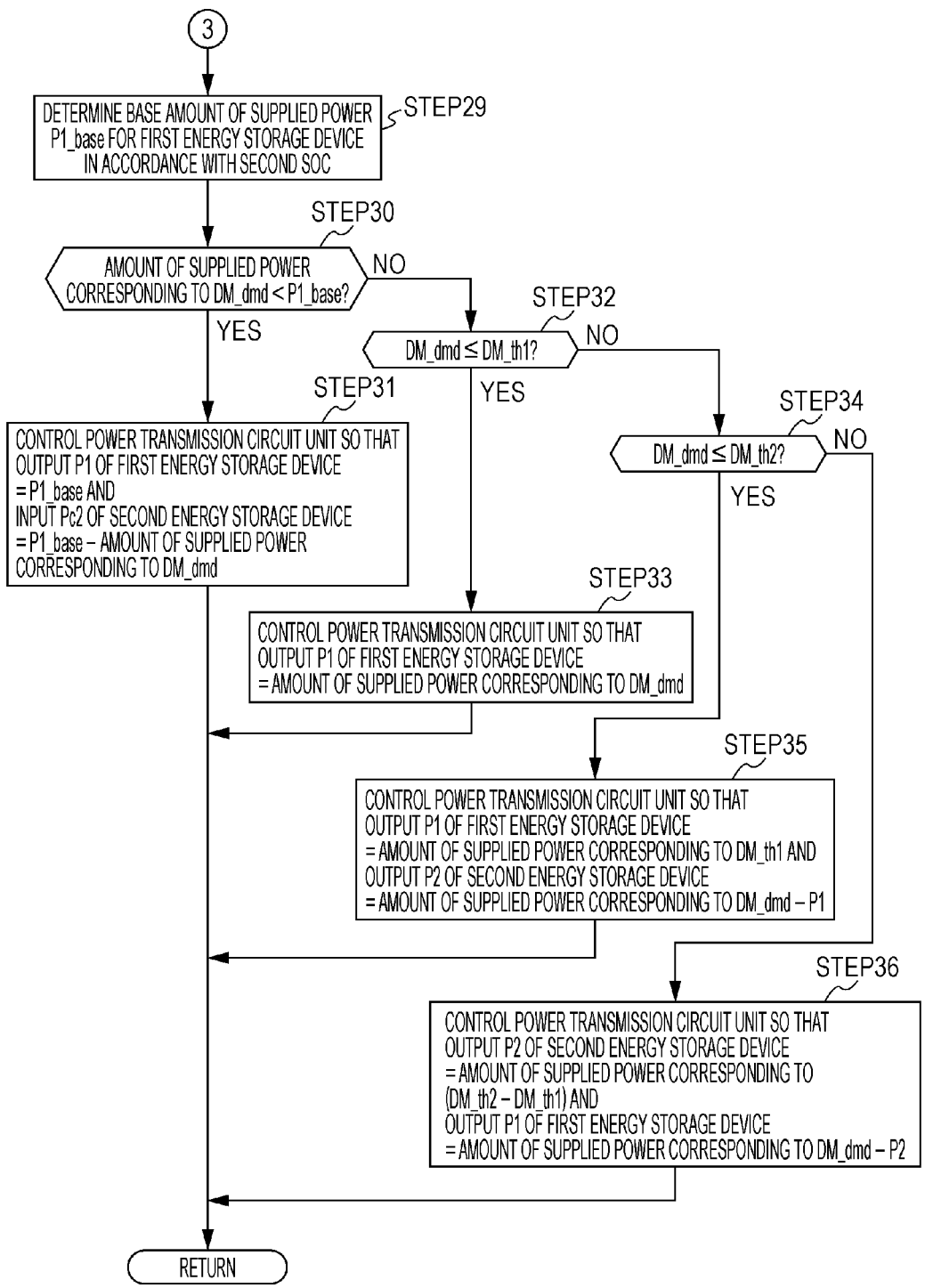
FIG. 6 is a flowchart illustrating the control process when power is supplied to the electric motor in the CD mode.
Figure 7:
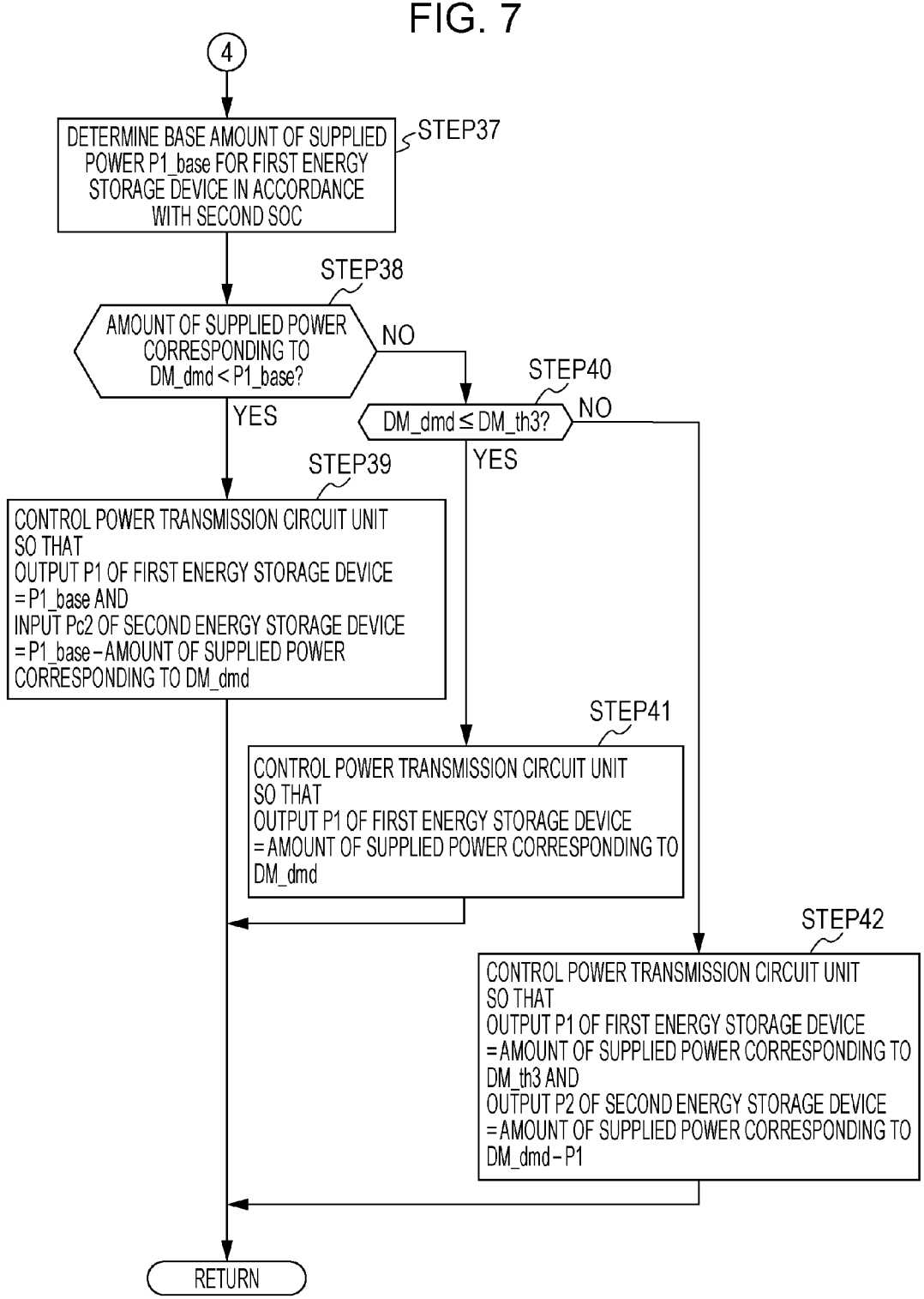
FIG. 7 is a flowchart illustrating the control process when power is supplied to the electric motor in the CD mode.

A control process for the power transmission controller 32 during the power-running operation of the electric motor 3 in the CD mode is sequentially executed in a predetermined control process cycle by using the map illustrated in FIG. 4 in accordance with a flowchart illustrated in FIGS. 5 to 7.

In STEP21, the power transmission controller 32 acquires the required output DM_dmd and a detected value of the second SOC. Then, in STEP22, the power transmission controller 32 determines whether or not the detected value of the second SOC acquired in STEP21 is greater than or equal to the threshold B2_th1, which is the upper limit of the medium-SOC area.

The determination result of STEP22 is affirmative in the situation where the detected value of the second SOC falls within the high-SOC area. In this case, then, in STEP23, the power transmission controller 32 determines whether or not the required output DM_dmd is less than or equal to a predetermined threshold DM_th1.

In this embodiment, the threshold DM_th1 is a threshold used for both the medium-SOC area and the high-SOC area. As illustrated in FIG. 4, the threshold DM_th1 is a predetermined constant value (fixed value) when the second SOC has a value greater than or equal to a predetermined value B2$d$ in the medium-SOC area. The constant value is a value determined so that the amount of supplied power corresponding to this value is sufficiently smaller than the allowable upper limit on the amount of supplied power which is output from the first energy storage device 5.

In a portion of the medium-SOC area smaller than the value B2$d$, the threshold DM_th1 is set so that the amount of supplied power corresponding to the threshold DM_th1 matches a base amount of supplied power P1_base described below (and consequently changes in accordance with the second SOC). In this case, the threshold DM_th1 increases as the second SOC decreases.

For additional explanation, the amount of supplied power corresponding to a certain threshold for the required output DM_dmd refers to the amount of electricity to be supplied to the electric motor 3 when the required output DM_dmd matches this threshold.

The determination result of STEP23 is affirmative for the lower diagonally hatched area in the high-SOC area illustrated in FIG. 4. In this case, in STEP24, the power transmission controller 32 controls the voltage converter 23 and the inverter 21 of the power transmission circuit unit 7 so that an output P1 of the first energy storage device 5 matches the amount of supplied power corresponding to the required output DM_dmd. In this case, the voltage converter 24 on the second energy storage device 6 side is controlled to block discharge from the second energy storage device 6.

The output P1 of the first energy storage device 5 is specifically an amount of electricity output (an amount of discharge) from the first energy storage device 5, and an output P2 of the second energy storage device 6 (described below) is specifically an amount of electricity output (an amount of discharge) from the second energy storage device 6. The amount of supplied power corresponding to the required output DM_dmd refers to the amount of electricity to be supplied to the electric motor 3 to realize the required output DM_dmd.

If the determination result of STEP23 is negative, then, in STEP25, the power transmission controller 32 determines whether or not the required output DM_dmd is less than or equal to a predetermined threshold DM_th2.

In this embodiment, similarly to the threshold DM_th1 in STEP23, the threshold DM_th2 is a threshold used for both the medium-SOC area and the high-SOC area. The threshold DM_th2 is set to a threshold larger than the threshold DM_th1 by a predetermined amount.

In this case, the threshold DM_th2 may be set so that, for example, the amount of supplied power equivalent to the difference between the threshold DM_th2 and the threshold DM_th1 (=DM_th2−DM_th1) is equal to the allowable upper limit on the amount of supplied power provided by the second energy storage device 6 in the CD mode or is equal to an amount of supplied power close to the allowable upper limit.

The determination result of STEP25 is affirmative for the shaded area in the high-SOC area illustrated in FIG. 4. In this case, in STEP26, the power transmission controller 32 controls the voltage converters 23 and 24 and the inverter 21 of the power transmission circuit unit 7 so that the output P1 of the first energy storage device 5 matches the amount of supplied power corresponding to the threshold DM_th1 and so that the output P2 of the second energy storage device 6 matches the amount of supplied power obtained by subtracting the output P1 of the first energy storage device 5 from the amount of supplied power corresponding to the required output DM_dmd.

On the other hand, the determination result of STEP25 is negative for the upper diagonally hatched area in the high-SOC area illustrated in FIG. 4. In this situation, in STEP27, the power transmission controller 32 controls the voltage converters 23 and 24 and the inverter 21 of the power transmission circuit unit 7 so that the output P2 of the second energy storage device 6 matches the amount of supplied power corresponding to the difference between the thresholds DM_th1 and DM_th2 (=DM_th2−DM_th1) and so that the output P1 of the first energy storage device 5 matches the amount of supplied power obtained by subtracting the output P2 of the second energy storage device 6 from the amount of supplied power corresponding to the required output DM_dmd.

If the determination result of STEP22 is negative, then, in STEP28, the power transmission controller 32 further determines whether or not the detected value of the second SOC is greater than or equal to the threshold B2_th2, which is the lower limit of the medium-SOC area.

The determination result of STEP28 is affirmative in the situation where the detected value of the second SOC falls within the medium-SOC area. In this case, then, in STEP29 illustrated in FIG. 6, the power transmission controller 32 determines the base amount of supplied power P1_base, which is a base value of the output P1 of the first energy storage device 5, in accordance with the detected value of the second SOC.

The base amount of supplied power P1_base is a lower limit on the amount of electricity that is output from the first energy storage device 5 regardless of the required output DM_dmd of the electric motor 3 when the detected value of the second SOC falls within the medium-SOC area or the low-SOC area. That is, in this embodiment, when the detected value of the second SOC falls within the medium-SOC area or the low-SOC area, the power transmission circuit unit 7 is controlled so that the base amount of supplied power P1_base or a larger amount of supplied power is output from the first energy storage device 5 regardless of the required output DM_dmd.

The base amount of supplied power P1_base is determined from the detected value of the second SOC on the basis of a pre-created map or a calculation formula so that the base amount of supplied power P1_base changes in accordance with the second SOC in a pattern indicated by a broken line illustrated in FIG. 4, for example. In this case, the base amount of supplied power P1_base is determined to successively increase from zero to a maximum value P1$b$ within the medium-SOC area in accordance with the decrease in the second SOC and to be kept constant at the maximum value P1$b$ within the low-SOC area. The maximum value P1$b$ is a value larger than the amount of supplied power corresponding to the threshold DM_th1 when the second SOC is greater than or equal to the predetermined value B2d in the medium-SOC area.

After the base amount of supplied power P1_base is determined in the way described above, then, in STEP30, the power transmission controller 32 determines whether or not the amount of supplied power corresponding to the required output DM_dmd is smaller than the base amount of supplied power P1_base.

The determination result of STEP30 is affirmative for an area below the broken line within the lower diagonally hatched area in the medium-SOC area illustrated in FIG. 4. In this situation, in STEP31, the power transmission controller 32 controls the voltage converters 23 and 24 and the inverter 21 of the power transmission circuit unit 7 so that the output P1 of the first energy storage device 5 matches the base amount of supplied power P1_base and so that an input Pc2 of the second energy storage device 6, that is, the amount of charge, matches the amount of supplied power obtained by subtracting the amount of supplied power corresponding to the required output DM_dmd from the base amount of supplied power P1_base.

If the determination result of STEP30 is negative, in STEP32, the power transmission controller 32 further determines whether or not the required output DM_dmd is less than or equal to the threshold DM_th1.

The determination result of STEP32 is affirmative for an area obtained by removing the area below the broken line from the lower diagonally hatched area in the medium-SOC area illustrated in FIG. 4 (specifically, an area obtained by combining the area along the broken line and an area above the broken line).

In this situation, in STEP33, as in STEP24, the power transmission controller 32 controls the voltage converter 23 and the inverter 21 of the power transmission circuit unit 7 so that the output P1 of the first energy storage device 5 matches the amount of supplied power corresponding to the required output DM_dmd. In this case, the voltage converter 24 on the second energy storage device 6 side is controlled to block discharge from the second energy storage device 6.

If the determination result of STEP32 is negative, in STEP34, the power transmission controller 32 further determines whether or not the required output DM_dmd is less than or equal to the threshold DM_th2.

The determination result of STEP34 is affirmative for the shaded area in the medium-SOC area illustrated in FIG. 4. In this situation, in STEP35, as in STEP26, the power transmission controller 32 controls the voltage converters 23 and 24 and the inverter 21 of the power transmission circuit unit 7 so that the output P1 of the first energy storage device 5 matches the amount of supplied power corresponding to the threshold DM_th1 and so that the output P2 of the second energy storage device 6 matches the amount of supplied power obtained by subtracting the output P1 of the first energy storage device 5 from the amount of supplied power corresponding to the required output DM_dmd.

On the other hand, the determination result of STEP34 is negative for the upper diagonally hatched area in the medium-SOC area illustrated in FIG. 4. In this situation, in STEP36, as in STEP27, the power transmission controller 32 controls the voltage converters 23 and 24 and the inverter 21 of the power transmission circuit unit 7 so that the output P2 of the second energy storage device 6 matches the amount of supplied power corresponding to the difference between the thresholds DM_th1 and DM_th2 (=DM_th2−DM_th1) and so that the output P1 of the first energy storage device 5 matches the amount of supplied power obtained by subtracting the output P2 of the second energy storage device 6 from the amount of supplied power corresponding to the required output DM_dmd.

Then, the determination result of STEP28 is negative in the situation where the detected value of the second SOC falls within the low-SOC area. In this case, then, in STEP37 illustrated in FIG. 7, the power transmission controller 32 determines the base amount of supplied power P1_base by using the same or substantially the same process as that in STEP29. Then, in STEP38, the power transmission controller 32 further determines whether or not the amount of supplied power corresponding to the required output DM_dmd is smaller than the base amount of supplied power P1_base.

The determination result of STEP38 is affirmative for an area below the broken line within the lower diagonally hatched area in the low-SOC area illustrated in FIG. 4. In this situation, in STEP39, as in STEP31, the power transmission controller 32 controls the voltage converters 23 and 24 and the inverter 21 of the power transmission circuit unit 7 so that the output P1 of the first energy storage device 5 matches the base amount of supplied power P1_base and so that the input Pc2 of the second energy storage device 6, that is, the amount of charge, matches the amount of supplied power obtained by subtracting the amount of supplied power corresponding to the required output DM_dmd from the base amount of supplied power P1_base.

If the determination result of STEP38 is negative, in STEP40, the power transmission controller 32 further determines whether or not the required output DM_dmd is less than or equal to a predetermined threshold DM_th3.

The determination result of STEP40 is affirmative for an area obtained by removing the area below the broken line from the diagonally hatched area in the low-SOC area illustrated in FIG. 4 (specifically, an area obtained by combining the area along the broken line and an area above the broken line).

In this situation, in STEP41, as in STEP24 or STEP33, the power transmission controller 32 controls the voltage converter 23 and the inverter 21 of the power transmission circuit unit 7 so that the output P1 of the first energy storage device 5 matches the amount of supplied power corresponding to the required output DM_dmd. In this case, the voltage converter 24 on the second energy storage device 6 side is controlled to block discharge from the second energy storage device 6.

On the other hand, the determination result of STEP40 is negative for the shaded area in the low-SOC area illustrated in FIG. 4. In this situation, in STEP42, the power transmission controller 32 controls the voltage converters 23 and 24 and the inverter 21 of the power transmission circuit unit 7 so that the output P1 of the first energy storage device 5 matches the amount of supplied power corresponding to the threshold DM_th3 and so that the output P2 of the second energy storage device 6 matches the amount of supplied power obtained by subtracting the output P1 of the first energy storage device 5 from the amount of supplied power corresponding to the required output DM_dmd.

The control process during the power-running operation of the electric motor 3 in the CD mode is executed in the way described above. In this control process, when the detected value of the second SOC falls within the high-SOC area, power is supplied from the second energy storage device 6 to the electric motor 3 in a range where the required output DM_dmd is less than or equal to the threshold DM_th2 (a comparatively commonly used range), except for the case where the required output DM_dmd is less than or equal to the comparatively small threshold DM_th1. In the high-SOC area, furthermore, the second energy storage device 6 is not charged with power provided by the first energy storage device 5.

This can make the second SOC close to the medium-SOC area where the progression of deterioration of the second energy storage device 6 is favorably suppressed.

When the detected value of the second SOC falls within the medium-SOC area or the low-SOC area, if the amount of supplied power corresponding to the required output DM_dmd is less than or equal to the base amount of supplied power P1_base, the output P1 of the first energy storage device 5 is retained at the base amount of supplied power P1_base, which is set in accordance with the detected value of the second SOC.

If the amount of supplied power corresponding to the required output DM_dmd is smaller than the base amount of supplied power P1_base, the amount of supplied power corresponding to the required output DM_dmd, which is included in the base amount of supplied power P1_base, is supplied from only the first energy storage device 5 to the electric motor 3 and, also, the amount of supplied power obtained by subtracting the amount of supplied power corresponding to the required output DM_dmd from the base amount of supplied power P1_base is provided to charge the second energy storage device 6.

In addition, as the second SOC decreases, the range of the required output DM_dmd in which the second energy storage device 6 is charged with power provided from the first energy storage device 5 is increased and the amount of charge to the second energy storage device 6 is more likely to increase.

As a result, when the second SOC falls within the medium-SOC area or the low-SOC area, if power is supplied from the second energy storage device 6 to the electric motor 3, then, the second energy storage device 6 can be basically replenished by being charged with power provided from the first energy storage device 5, as appropriate. This enables the second SOC to be maintained within the medium-SOC area as much as possible. Therefore, the progression of deterioration of the second energy storage device 6 can be minimized. In addition, a portion of the capacity of the second energy storage device 6 which is used in the CS mode, described below, can be saved as much as possible.

Furthermore, when the second energy storage device 6 is charged, the base amount of supplied power P1_base to be output from the first energy storage device 5 is set in accordance with the second SOC regardless of the required output DM_dmd. Thus, the output P2 or the input Pc2 of the second energy storage device 6 changes in response to a change in the required output DM_dmd, and the change in the output P1 of the first energy storage device 5 is less sensitive to the change in the required output DM_dmd.

In particular, the base amount of supplied power P1_base in the low-SOC area is a constant value (=P1*b*). This prevents the output P1 of the first energy storage device 5 from changing in accordance with the change in required driving force DT_dmd.

As a result, in the situation where the second energy storage device 6 is charged (when the amount of supplied power corresponding to the required output DM_dmd is less than the base amount of supplied power P1_base), the output P1 of the first energy storage device 5 is of high stability with less frequent changes. Therefore, the progression of deterioration of the first energy storage device 5 can be minimized.

In this embodiment, when the second SOC is greater than or equal to the predetermined value B2*d*, if the amount of supplied power corresponding to the required output DM_dmd is less than or equal to the threshold DM_th1, power is supplied from only the first energy storage device 5 to the electric motor 3. This can reduce the load placed on the second energy storage device 6 when the second SOC is greater than or equal to the predetermined value B2*d*, resulting in the total amount of heat generation of the first energy storage device 5 and the second energy storage device 6 being reduced.

Figure 8:
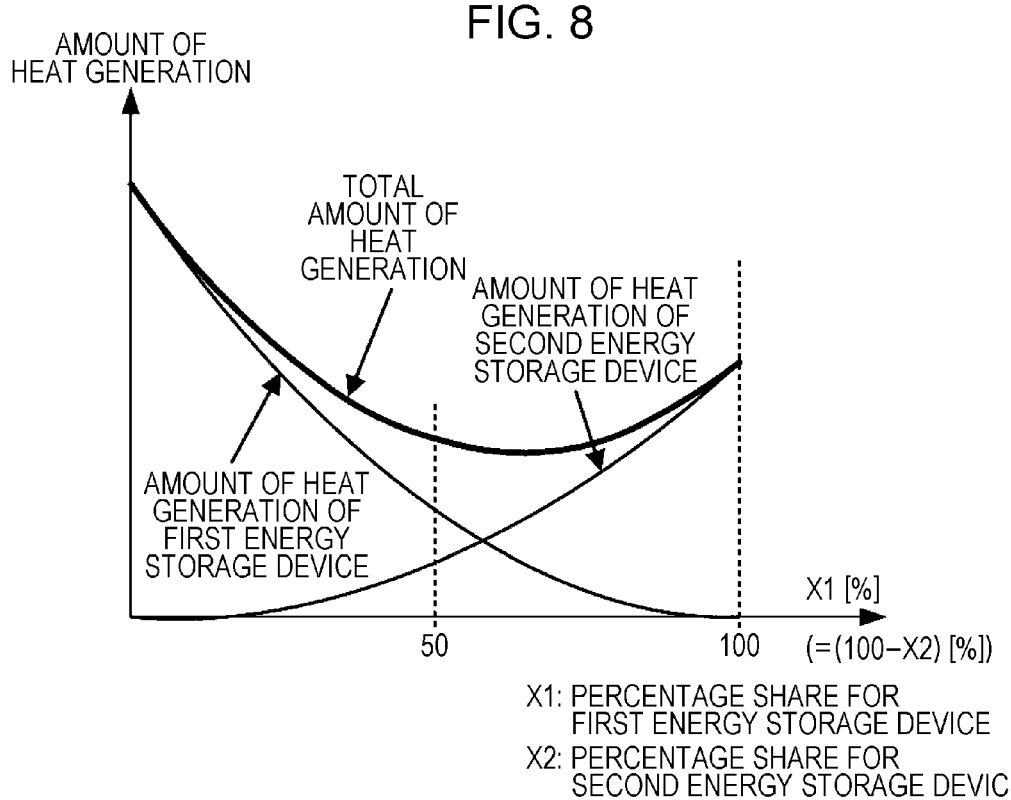
FIG. 8 is a graph exemplifying the relationship between the respective percentage shares undertaken by the first energy storage device and the second energy storage device and the respective amounts of heat generation of the first energy storage device and the second energy storage device.

FIG. 8 is a graph illustrating how the respective amounts of heat generation of the energy storage devices 5 and 6 and the total amount of heat generation of the energy storage devices 5 and 6 change in response to a change in percentage shares X1 and X2 of the constant required output DM_dmd that are undertaken by the first energy storage device 5 and the second energy storage device 6.

The percentage share X1 refers to the proportion of the share undertaken by the first energy storage device 5 in the amount of supplied power corresponding to the constant required output DM_dmd, and the percentage share X2 refers to the proportion of the share undertaken by the second energy storage device 6 in the amount of supplied power corresponding to the constant required output DM_dmd.

The second energy storage device 6 with relatively high power density has a lower impedance (internal resistance) than the first energy storage device 5 with relatively high energy density but includes fewer cells connected in parallel than the first energy storage device 5, and therefore has a lower output voltage than the first energy storage device 5. For this reason, when the percentage share X2 for the second energy storage device 6 is increased with respect to a certain constant value of the required output DM_dmd, the amount of heat generation of the second energy storage device 6 is likely to increase, compared with when the percentage share X1 for the first energy storage device 5 is increased (see two thin lines in the graph illustrated in FIG. 8).

As a result, as indicated by a thick line in the graph illustrated in FIG. 8, the total amount of heat generation of the first energy storage device 5 and the second energy storage device 6 becomes minimum when the percentage share X1 becomes greater than the percentage share X2.

In this embodiment, accordingly, when the second SOC is greater than or equal to the predetermined value B2*d*, if the amount of supplied power corresponding to the required output DM_dmd is less than or equal to the threshold DM_th1, power is supplied from only the first energy storage device 5 to the electric motor 3 to reduce the load placed on the second energy storage device 6 to such an extent that the load placed on the first energy storage device 5 does not become excessive.

This configuration can minimize the total amount of heat generation of the first energy storage device 5 and the second energy storage device 6 while preventing the second energy storage device 6 from generating excessive heat. In other words, load can be prevented from being concentrated on one of the first energy storage device 5 and the second energy storage device 6.

Control Process During Regenerative Operation in CD Mode

Next, a control process executed by the power transmission controller 32 during the regenerative operation of the electric motor 3 in the CD mode will be described in detail hereinafter with reference to FIGS. 9 and 10.

FIG. 9 is a map that defines, in the CD mode, how the regenerative power output by the electric motor 3 during the regenerative operation is shared in order to charge the first energy storage device 5 and the second energy storage device 6 in accordance with the required amount of regeneration G_dmd of the electric motor 3 and the second SOC.

In FIG. 9, diagonally hatched areas represent areas where all or part of the regenerative power generated by the electric motor 3 is used to charge the first energy storage device 5, and a shaded area represents an area where all or part of the regenerative power is used to charge the second energy storage device 6.

More specifically, the lower diagonally hatched area in the medium-SOC area and the high-SOC area of the second SOC represents an area where all of the regenerative power is used to charge only the first energy storage device 5. The shaded area in the medium-SOC area and the high-SOC area of the second SOC and the upper diagonally hatched area in the low-SOC area and the medium-SOC area represent areas where the regenerative power is used to charge both the first energy storage device 5 and the second energy storage device 6. The shaded area in the low-SOC area of the second SOC represents an area where all of the regenerative power is used to charge only the second energy storage device 6.

On the map illustrated in FIG. 9, G_max1 is a maximum value of the required amount of regeneration G_dmd in the CD mode. The maximum value G_max1 is a constant value when the second SOC is an SOC less than or equal to a predetermined value B2$f$ in the high-SOC area. When the second SOC is larger than the value B2$f$, the maximum value G_max1 decreases as the second SOC increases.

Figure 10:
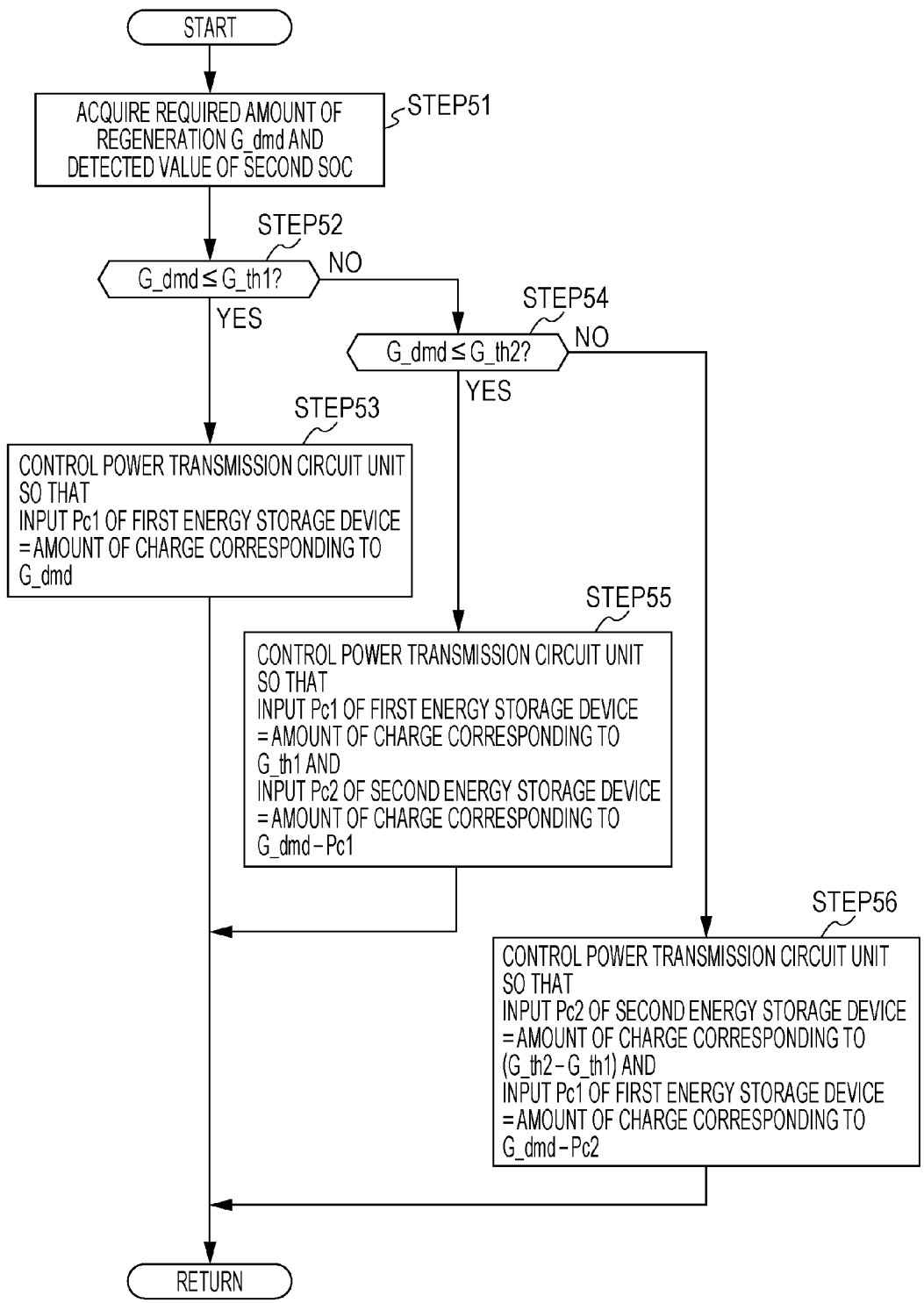
FIG. 10 is a flowchart illustrating a control process during the regenerative operation of the electric motor in the CD mode.

The control process for the power transmission controller 32 during the regenerative operation of the electric motor 3 in the CD mode is sequentially executed in a predetermined control process cycle in accordance with a flowchart illustrated in FIG. 10 by using the map illustrated in FIG. 9.

In STEP51, the power transmission controller 32 acquires the required amount of regeneration G_dmd and a detected value of the second SOC.

Then, in STEP52, the power transmission controller 32 determines whether or not the required amount of regeneration G_dmd is less than or equal to a predetermined threshold G_th1.

In this embodiment, the threshold G_th1 is set in accordance with the second SOC. Specifically, as exemplified in FIG. 9, when the second SOC falls within the high-SOC area, the threshold G_th1 is set to a predetermined constant value.

When the second SOC falls within the medium-SOC area, the threshold G_th1 is set to successively decrease from the constant value to zero in accordance with the decrease in the second SOC. In the low-SOC area of the second SOC, the threshold G_th1 is set to zero.

The amount of charge corresponding to a maximum value of the threshold G_th1 (the constant value in the high-SOC area) is an upper limit on the amount of regenerative power that is used to charge the first energy storage device 5. The upper limit is determined to be a comparatively small value so as to allow the first energy storage device 5 to be charged at a low rate (low speed) to minimize the progression of deterioration of the first energy storage device 5.

For additional explanation, the amount of charge corresponding to a certain threshold for the required amount of regeneration G_dmd refers to the amount of electricity representing the total regenerative power output from the electric motor 3 when the required amount of regeneration G_dmd matches this threshold.

The determination result of STEP52 is affirmative for the lower diagonally hatched area illustrated in FIG. 9. In this situation, in STEP53, the power transmission controller 32 controls the voltage converter 23 and the inverter 21 of the power transmission circuit unit 7 so that an input Pc1 of the first energy storage device 5 matches the amount of charge corresponding to the required amount of regeneration G_dmd. In this case, the voltage converter 24 on the second energy storage device 6 side is controlled to block charging of the second energy storage device 6.

The input Pc1 of the first energy storage device 5 is specifically an amount of electricity (the amount of charge) with which the first energy storage device 5 is charged, and the input Pc2 of the second energy storage device 6 (described below) is specifically an amount of electricity (an amount of charge) with which the second energy storage device 6 is charged. The amount of charge corresponding to the required amount of regeneration G_dmd refers to the amount of electricity representing the regenerative power output from the electric motor 3 when the regenerative operation of the electric motor 3 is performed in accordance with the required amount of regeneration G_dmd.

For additional explanation, when the detected value of the second SOC during the regenerative operation of the electric motor 3 falls within the low-SOC area, the threshold G_th1 is zero and thus no affirmative determination is made in STEP52. Thus, in this case, the processing of STEP53 is not executed.

If the determination result of STEP52 is negative, then, in STEP54, the power transmission controller 32 determines whether or not the required amount of regeneration G_dmd is less than or equal to a predetermined threshold G_th2.

In this embodiment, the threshold G_th2 is set in accordance with the second SOC in a way similar to that for the threshold G_th1 in STEP52 described above. Specifically, as exemplified in FIG. 9, when the second SOC falls within the low-SOC area, the threshold G_th2 is set to a predetermined constant value. The constant value is set so that the amount of charge corresponding to the difference between the threshold G_th2 and the maximum value G_max1 of the required amount of regeneration G_dmd (=G_max1−G_th2) matches the amount of charge corresponding to the maximum value of the threshold G_th1 (the value of the threshold G_th1 in the high-SOC area), that is, the upper limit on the amount of charge to the first energy storage device 5.

When the second SOC falls within the medium-SOC area, the threshold G_th2 is set to increase to the maximum value G_max1 in accordance with the increase in the second SOC in a pattern similar to the pattern in which the threshold G_th1 changes. In the high-SOC area of the second SOC, the threshold G_th1 is kept at the constant maximum value G_max1.

In the medium-SOC area, the thresholds G_th1 and G_th2 are set so that the sum of the amount of charge corresponding to the difference between the maximum value G_max1 and the threshold G_th2 (=G_max1−G_th2) and the amount of charge corresponding to the threshold G_th1 matches the upper limit on the amount of charge to the first energy storage device 5.

The determination result of STEP54 is affirmative for the shaded area illustrated in FIG. 9. In this situation, in STEP55, the power transmission controller 32 controls the voltage converters 23 and 24 and the inverter 21 of the power transmission circuit unit 7 so that the input Pc1 of the first energy storage device 5 matches the amount of charge corresponding to the threshold G_th1 and so that the input Pc2 of the second energy storage device 6 matches the amount of charge obtained by subtracting the input Pc1 of the first energy storage device 5 from the amount of charge corresponding to the required amount of regeneration G_dmd.

On the other hand, the determination result of STEP54 is negative for the upper diagonally hatched area in the low-SOC area or the medium-SOC area illustrated in FIG. 9. In this situation, in STEP56, the power transmission controller 32 controls the voltage converters 23 and 24 and the inverter 21 of the power transmission circuit unit 7 so that the input Pc2 of the second energy storage device 6 matches the amount of charge corresponding to the difference between the thresholds G_th1 and G_th2 (=G_th2−G_th1) and so that the input Pc1 of the first energy storage device 5 matches the amount of charge obtained by subtracting the input Pc2 of the second energy storage device 6 from the amount of charge corresponding to the required amount of regeneration G_dmd.

For additional explanation, when the detected value of the second SOC during the regenerative operation of the electric motor 3 falls within the high-SOC area, the threshold G_th2 matches the maximum value G_max1 and thus no negative determination is made in STEP54. Thus, in this case, the processing of STEP56 is not executed.

The control process during the regenerative operation of the electric motor 3 in the CD mode is executed in the way described above. In this control process, when the detected value of the second SOC is larger than the threshold B2_th2, which is the lower limit of the medium-SOC area, the first energy storage device 5 is preferentially charged with regenerative power in the range where the required amount of regeneration G_dmd is less than or equal to the threshold G_th1.

Further, when the detected value of the second SOC is smaller than the threshold B2_th1, which is the upper limit of the medium-SOC area, the first energy storage device 5 is charged with regenerative power within a range where the required amount of regeneration G_dmd is larger than the threshold G_th2.

The amount of regenerative power that is used to charge the first energy storage device 5 is limited to a value less than or equal to a predetermined upper limit (the amount of charge corresponding to the threshold G_th1 in the high-SOC area).

This configuration enables the first energy storage device 5 to be charged with regenerative power at a low rate. Thus, it is possible to restore the SOC of the first energy storage device 5 while suppressing the progression of deterioration of the first energy storage device 5.

When the detected value of the second SOC is smaller than the threshold B2_th2, which is the lower limit of the medium-SOC area, the second energy storage device 6 is preferentially charged with regenerative power. When the detected value of the second SOC is larger than the threshold B2_th2, which is the lower limit of the medium-SOC area, the second energy storage device 6 is charged with regenerative power within a range where the required amount of regeneration G_dmd is larger than the threshold G_th1.

This configuration enables the second energy storage device 6 to be charged with regenerative power so that the SOC of the second energy storage device 6 can be kept within the medium-SOC area as much as possible. As a result, the progression of deterioration of the second energy storage device 6 can be minimized, and a portion of the capacity of the second energy storage device 6 which is used in the CS mode, described below, can be saved as much as possible.

Control Process for First CS Mode

Next, the control process for the first CS mode in STEP6 will be described in detail with reference to FIGS. 11 to 15.

The control device 8 determines a required driving force (required propulsion force) or required braking force of the entire vehicle in a way similar to that in the CD mode and also determines the respective target operating states of the internal combustion engine 2, the electric motor 3, the electric generator 4, the clutch 11, and the brake device.

In the first CS mode, the control device 8 determines the necessity of operation of the internal combustion engine 2 and the necessity of power generation operation of the electric generator 4, if necessary, in accordance with the required driving force or required braking force of the entire vehicle, the detected value of the second SOC, or the like, and controls the operation of the internal combustion engine 2 and the electric generator 4 in accordance with the determination result.

In this case, the start of the internal combustion engine 2 and the power generation operation of the electric generator 4 are performed in the way described above in connection with the processing of STEP7.

In the vehicle driving request state (in the state where the required driving force is not zero) during the operation of the internal combustion engine 2, the control device 8 determines the respective shares of the required driving force of the entire vehicle that are undertaken by the electric motor 3 and the internal combustion engine 2 in accordance with the required driving force of the entire vehicle, the detected values of the first SOC and the second SOC, and so on.

In this case, the respective shares undertaken by the electric motor 3 and the internal combustion engine 2 are determined so that, basically, except for the case where the second SOC is comparatively high, the required driving force is provided entirely or mostly by the internal combustion engine 2 whereas the electric motor 3 serves as an auxiliary.

The control device 8 causes the internal combustion engine operation controller 31 to control the motive power (output torque) of the internal combustion engine 2 in accordance with the share of the required driving force that is undertaken by the internal combustion engine 2, and also causes the clutch controller 33 to control the operating state of the clutch 11. In a situation where the power generation operation of the electric generator 4 is performed, motive power necessary for the power generation operation of the electric generator 4 is added to the motive power of the internal combustion engine 2.

Further, the control device 8 determines the required output DM_dmd of the electric motor 3 so that the share of the required driving force which is undertaken by the electric motor 3 is realized by the motive power generated through the power-running operation of the electric motor 3.

Figure 11:
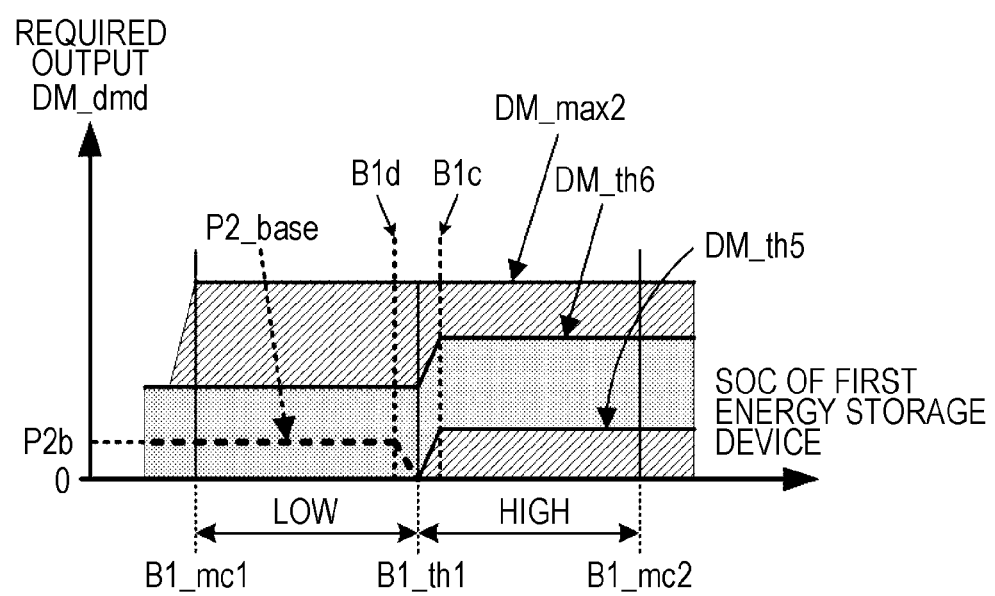
FIG. 11 illustrates a map used in a control process when power is supplied to the electric motor in a first charge-sustaining (CS) mode.

Then, the control device 8 causes the power transmission controller 32 to control the inverter 21 on the electric motor 3 side and the voltage converters 23 and 24 of the power transmission circuit unit 7 to supply power from either or both of the first energy storage device 5 and the second energy storage device 6 to the electric motor 3 in accordance with a pre-created map illustrated in FIG. 11 on the basis of the required output DM_dmd and the detected value of the SOC of the first energy storage device 5 (i.e., the first SOC).

In the first CS mode, even in a situation where the share of the required driving force that is undertaken by the electric motor 3 is zero (a situation where the power-running operation of the electric motor 3 is not performed), the control device 8 causes the power transmission controller 32 to control the voltage converters 23 and 24 of the power transmission circuit unit 7 so that, when the detected value of the first SOC is comparatively small, the first energy storage device 5 is charged with power provided from the second energy storage device 6.

In the vehicle driving request state when the internal combustion engine 2 is not in operation, the control device 8 determines the required output DM_dmd of the electric motor 3 so that the required driving force of the entire vehicle is realized by the motive power generated through the power-running operation of the electric motor 3.

Then, similarly to when the internal combustion engine 2 is in operation, the control device 8 causes the power transmission controller 32 to control the inverter 21 on the electric motor 3 side and the voltage converters 23 and 24 of the power transmission circuit unit 7 in accordance with the map illustrated in FIG. 11 on the basis of the required output DM_dmd and the detected value of the first SOC.

In the vehicle braking request state (in the state where the required braking force is not zero), the control device 8 determines the respective shares of the required braking force of the entire vehicle that are undertaken by the electric motor 3 and the brake device. In this case, the control device 8 determines the respective shares undertaken by the electric motor 3 and the brake device on the basis of the magnitude of the required braking force, the detected value of the first SOC, and so on so that the share of the required braking force which is undertaken by the electric motor 3 generally becomes as high as possible.

Then, the control device 8 causes the brake controller 34 to control the brake device in accordance with the share of the required braking force that is undertaken by the brake device.

Further, the control device 8 determines the required amount of regeneration G_dmd of the electric motor 3 so that the share of the required braking force which is undertaken by the electric motor 3 is realized by the regenerative braking force generated through the regenerative operation of the electric motor 3.

Figure 14:
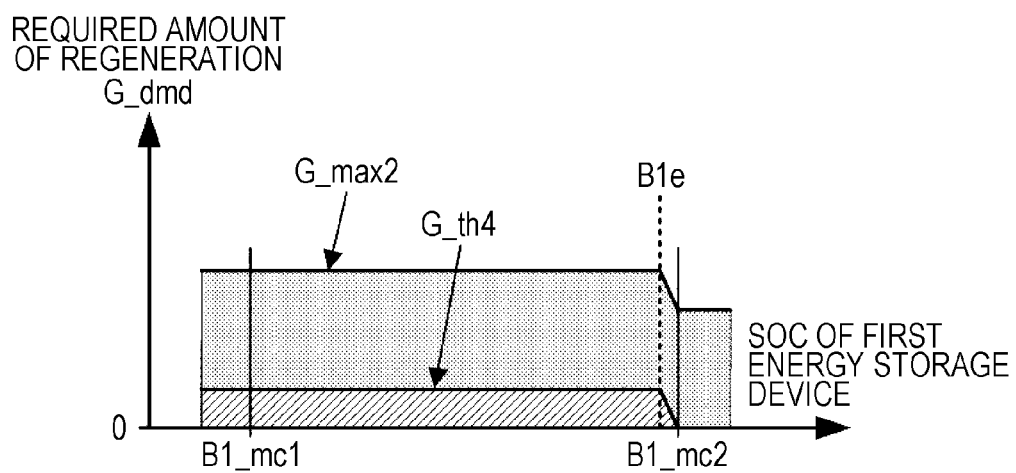
FIG. 14 illustrates a map used in a control process during the regenerative operation of the electric motor in the first CS mode.

Then, the control device 8 causes the power transmission controller 32 to control the inverter 21 on the electric motor 3 side and the voltage converters 23 and 24 of the power transmission circuit unit 7 to charge either or both of the first energy storage device 5 and the second energy storage device 6 with the regenerative power output from the electric motor 3 in accordance with a pre-created map illustrated in FIG. 14 on the basis of the required amount of regeneration G_dmd and the detected value of the second SOC. In this embodiment, the main energy storage device to be charged with the regenerative power in the first CS mode is the second energy storage device 6.

The power generation operation of the electric generator 4 is stopped during the regenerative operation of the electric motor 3 or during power supply from the second energy storage device 6 to the electric motor 3. Note that charging of the second energy storage device 6 with the regenerative power of the electric motor 3 and charging of the second energy storage device 6 with the generated power of the electric generator 4 may be performed in parallel.

Control Process During Power-Running Operation in First CS Mode

A control process executed by the power transmission controller 32 during the power-running operation of the electric motor 3 in the first CS mode will be described in detail hereinafter with reference to FIGS. 11 to 13.

FIG. 11 illustrates a map depicting how the first energy storage device 5 and the second energy storage device 6 output power to meet the demand for the amount of electricity (the amount of supplied power) to be supplied to the electric motor 3 in the first CS mode in accordance with the required output DM_dmd of the electric motor 3 and the first SOC.

In FIG. 11, diagonally hatched areas represent areas where all or part of the amount of supplied power to the electric motor 3 is provided by the first energy storage device 5, and a shaded area represents an area where all or part of the amount of supplied power to the electric motor 3 is provided by the second energy storage device 6.

More specifically, the lower diagonally hatched area represents an area where all the amount of supplied power to the electric motor 3 is provided by only the first energy storage device 5, and a shaded area represents an area where the amount of supplied power to the electric motor 3 is provided by only the second energy storage device 6 or by both the first energy storage device 5 and the second energy storage device 6. The upper diagonally hatched area represents an area where the amount of supplied power to the electric motor 3 is provided by both the first energy storage device 5 and the second energy storage device 6.

On the map illustrated in FIG. 11, DM_max2 is a maximum value of the required output DM_dmd in the first CS mode. The maximum value DM_max2 is a constant value.

In the control process during the power-running operation of the electric motor 3 in the first CS mode, as illustrated in FIG. 11, the first energy storage device 5 and the second energy storage device 6 output power in manners which differ depending on whether the value of the first SOC falls within a high-SOC area (high-remaining-capacity area) or a low-SOC area (low-remaining-capacity area) in the range between the CD→CS switching threshold B1_mc1 (see FIG. 2) and the CS→CD switching threshold B1_mc2 (see FIG. 2) described above. The high-SOC area is an area where SOC≥B1_th1 is satisfied, and the low-SOC area is an area where SOC<B1_th1 is satisfied. B1_th1 is a predetermined threshold (fixed value) between the CD→CS switching threshold B1_mc1 and the CS→CD switching threshold B1_mc2.

Figure 12:
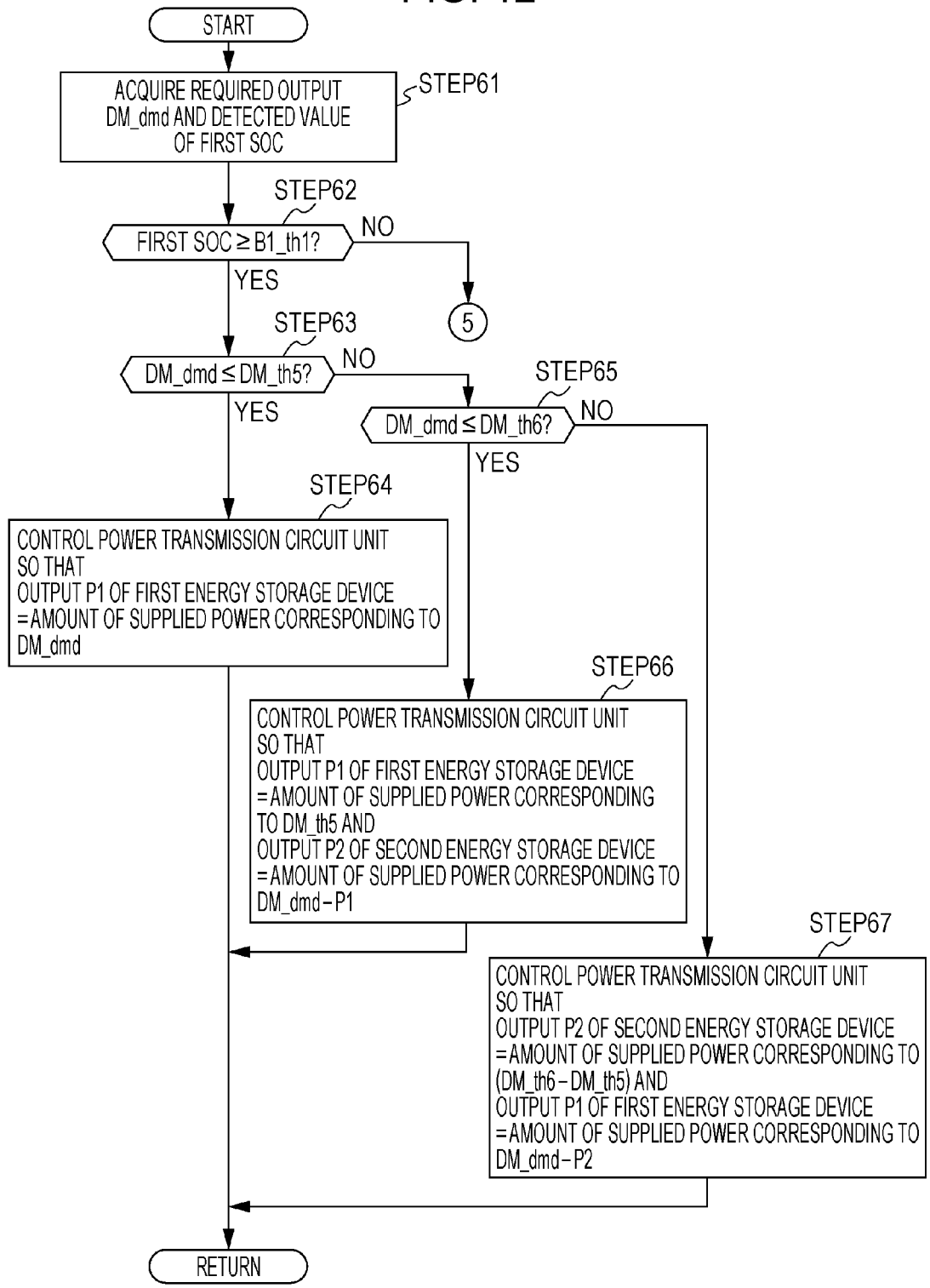
FIG. 12 is a flowchart illustrating a control process when power is supplied to the electric motor in the first CS mode.
Figure 13:
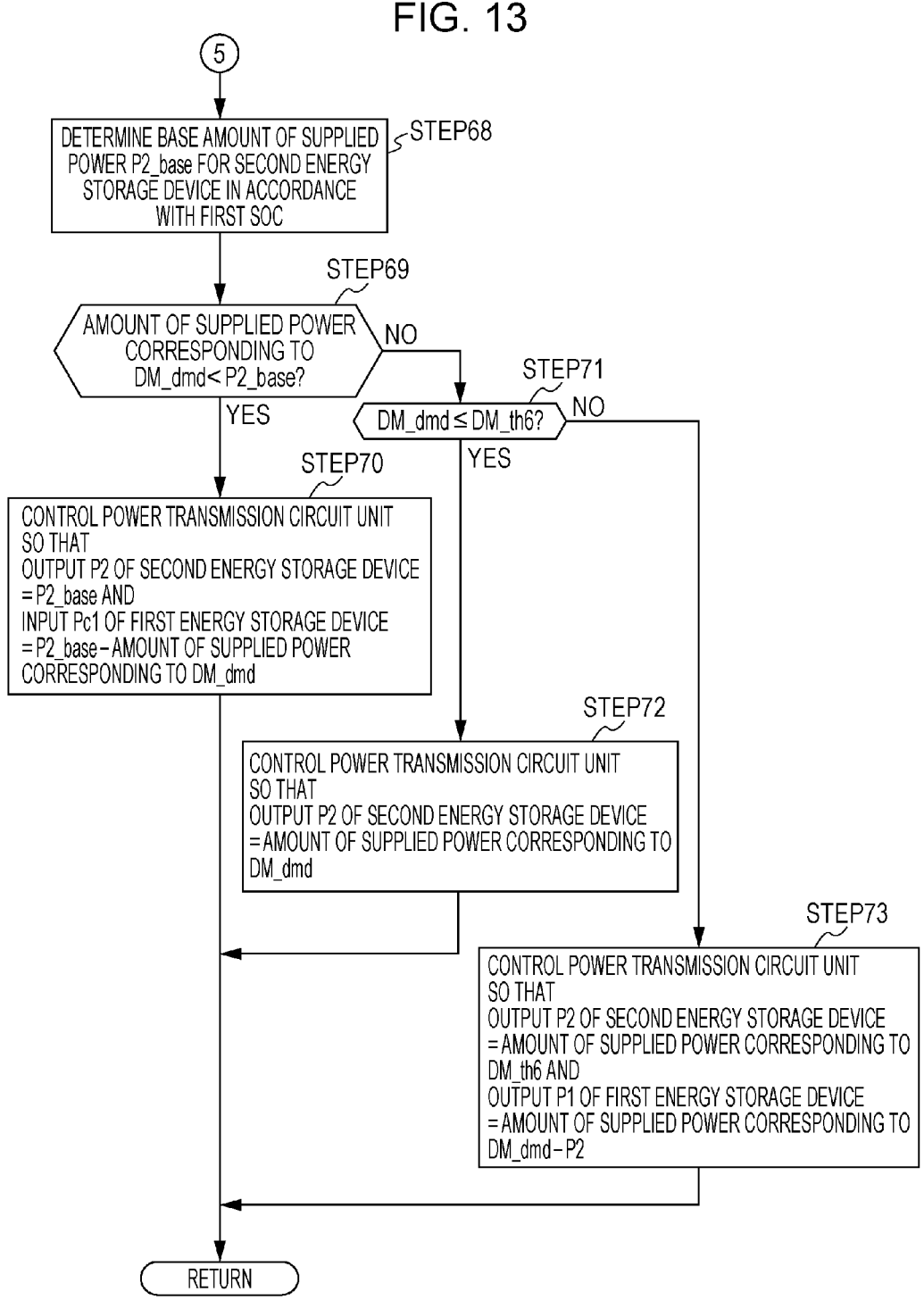
FIG. 13 is a flowchart illustrating the control process when power is supplied to the electric motor in the first CS mode.

The control process for the power transmission controller 32 during the power-running operation of the electric motor 3 in the first CS mode is sequentially executed in a predetermined control process cycle by using the map illustrated in FIG. 11 in accordance with a flowchart illustrated in FIGS. 12 and 13.

In STEP61, the power transmission controller 32 acquires the required output DM_dmd and a detected value of the first SOC. Then, in STEP62, the power transmission controller 32 determines whether or not the detected value of the first SOC acquired in STEP61 is greater than or equal to the threshold B1_th1.

The determination result of STEP62 is affirmative in the situation where the detected value of the first SOC falls within the high-SOC area. In this case, then, in STEP63, the power transmission controller 32 determines whether or not the required output DM_dmd is less than or equal to a predetermined threshold DM_th5.

As illustrated in FIG. 11, the threshold DM_th5 is a predetermined constant value (fixed value) when the first SOC has a value greater than or equal to a predetermined value B1c that is slightly larger than the threshold B1_th1. The constant value is a value sufficiently smaller than the allowable upper limit on the amount of supplied power which is output from the first energy storage device 5.

In the area less than the value B1c (the range of B1c to B1_th1), the threshold DM_th5 is set to decrease to zero in accordance with the decrease in the first SOC.

The determination result of STEP63 is affirmative for the lower diagonally hatched area in the high-SOC area illustrated in FIG. 11. In this case, in STEP64, the power transmission controller 32 controls the voltage converter 23 and the inverter 21 of the power transmission circuit unit 7 so that the output P1 of the first energy storage device 5 matches the amount of supplied power corresponding to the required output DM_dmd. In this case, the voltage converter 24 on the second energy storage device 6 side is controlled to block discharge from the second energy storage device 6.

If the determination result of STEP63 is negative, then, in STEP65, the power transmission controller 32 determines whether or not the required output DM_dmd is less than or equal to a predetermined threshold DM_th6.

In this embodiment, the threshold DM_th6 is a threshold used for both the high-SOC area and the low-SOC area of the first SOC. The threshold DM_th6 is set to a threshold that is larger than the threshold DM_th5 by a predetermined amount in the high-SOC area, and is set to a threshold that is larger than zero by the predetermined amount (i.e., the threshold is equal to the predetermined amount) in the low-SOC area.

In this case, the threshold DM_th6 can be set so that, for example, the amount of supplied power corresponding to the predetermined amount is equal to the allowable upper limit on the amount of supplied power provided by the second energy storage device 6 in the first CS mode or an amount of supplied power close to the allowable upper limit.

The required output DM_dmd, which is less than or equal to the threshold DM_th6, is in a commonly used range of the electric motor 3 in the first CS mode.

The determination result of STEP65 is affirmative for the shaded area in the high-SOC area illustrated in FIG. 11. In this case, in STEP66, the power transmission controller 32 controls the voltage converters 23 and 24 and the inverter 21 of the power transmission circuit unit 7 so that the output P1 of the first energy storage device 5 matches the amount of supplied power corresponding to the threshold DM_th5 and so that the output P2 of the second energy storage device 6 matches the amount of supplied power obtained by subtracting the output P1 of the first energy storage device 5 from the amount of supplied power corresponding to the required output DM_dmd.

On the other hand, the determination result of STEP65 is negative for the upper diagonally hatched area in the high-SOC area illustrated in FIG. 11. In this situation, in STEP67, the power transmission controller 32 controls the voltage converters 23 and 24 and the inverter 21 of the power transmission circuit unit 7 so that the output P2 of the second energy storage device 6 matches the amount of supplied power corresponding to the difference between the thresholds DM_th5 and DM_th6 (=DM_th6−DM_th5) and so that the output P1 of the first energy storage device 5 matches the amount of supplied power obtained by subtracting the output P2 of the second energy storage device 6 from the amount of supplied power corresponding to the required output DM_dmd.

The determination result of STEP62 is negative in the situation where the detected value of the first SOC falls within the low-SOC area. In this case, in STEP68 illustrated in FIG. 13, the power transmission controller 32 further determines a base amount of supplied power P2_base, which is a base value of the output P2 of the second energy storage device 6, in accordance with the detected value of the first SOC.

The base amount of supplied power P2_base is a lower limit on the amount of electricity that is output from the second energy storage device 6 regardless of the required output DM_dmd of the electric motor 3 when the detected value of the first SOC falls within the low-SOC area. That is, in this embodiment, when the detected value of the first SOC falls within the low-SOC area during the power-running operation of the electric motor 3, the power transmission circuit unit 7 is controlled so that the base amount of supplied power P2_base or a larger amount of supplied power is output from the second energy storage device 6 regardless of the required output DM_dmd.

In this embodiment, in the first CS mode, the power transmission circuit unit 7 is controlled so that also in a situation where the power-running operation of the electric motor 3 is not performed (in a situation where the required driving force of the entire vehicle is provided by only the internal combustion engine 2), the base amount of supplied power P2_base is output from the second energy storage device 6 to charge the first energy storage device 5.

The base amount of supplied power P2_base is determined from the detected value of the first SOC on the basis of a pre-created map or a calculation formula so that the base amount of supplied power P2_base changes in accordance with the first SOC in a pattern indicated by a broken line illustrated in FIG. 11, for example. In this case, the base amount of supplied power P2_base is determined to successively increase from zero to a maximum value P2b in accordance with the decrease in the first SOC when the first SOC is an SOC in a range between the threshold B1_th1 and a predetermined value B1d that is slightly smaller than the threshold B1_th1, and is determined to be kept constant at the maximum value P2b when the first SOC is in a range less than or equal to the predetermined value B1d. The maximum value P2b is a value smaller than the amount of supplied power corresponding to the threshold DM_th6 for the required output DM_dmd in the low-SOC area of the first SOC. The maximum value P2b is set so that, even if the first energy storage device 5 is charged with a large portion of the power equal to the maximum value P2b, the first energy storage device 5 can be charged at a low rate at which the progression of deterioration of the first energy storage device 5 can be suppressed.

After the base amount of supplied power P2_base is determined in the way described above, then, in STEP69, the power transmission controller 32 determines whether or not the amount of supplied power corresponding to the required output DM_dmd is smaller than the base amount of supplied power P2_base.

The determination result of STEP69 is affirmative for an area below the broken line within the shaded area in the low-SOC area illustrated in FIG. 11. In this situation, in STEP70, the power transmission controller 32 controls the voltage converters 23 and 24 and the inverter 21 of the power transmission circuit unit 7 so that the output P2 of the second energy storage device 6 matches the base amount of supplied power P2_base and so that the input Pc1 (the amount of charge) of the first energy storage device 5 matches the amount of supplied power obtained by subtracting the amount of supplied power corresponding to the required output DM_dmd from the base amount of supplied power P2_base.

If the determination result of STEP69 is negative, in STEP71, the power transmission controller 32 further determines whether or not the required output DM_dmd is less than or equal to the threshold DM_th6.

The determination result of STEP71 is affirmative for an area obtained by removing the area below the broken line from the shaded area in the low-SOC area illustrated in FIG. 11 (specifically, an area obtained by combining the area along the broken line and an area above the broken line).

In this situation, in STEP72, the power transmission controller 32 controls the voltage converter 24 and the inverter 21 of the power transmission circuit unit 7 so that the output P2 of the second energy storage device 6 matches the amount of supplied power corresponding to the required output DM_dmd. In this case, the voltage converter 23 on the first energy storage device 5 side is controlled to block discharge from the first energy storage device 5.

On the other hand, the determination result of STEP71 is negative for the upper diagonally hatched area in the low-SOC area illustrated in FIG. 11. In this situation, in STEP73, the power transmission controller 32 controls the voltage converters 23 and 24 and the inverter 21 of the power transmission circuit unit 7 so that the output P2 of the second energy storage device 6 matches the amount of supplied power corresponding to the threshold DM_th6 in the low-SOC area and so that the output P1 of the first energy storage device 5 matches the amount of supplied power obtained by subtracting the output P2 of the second energy storage device 6 from the amount of supplied power corresponding to the required output DM_dmd.

The control process during the power-running operation of the electric motor 3 in the first CS mode is executed in the way described above. In this control process, when the detected value of the first SOC falls within the low-SOC area, the output P2 of the second energy storage device 6 is retained at the base amount of supplied power P2_base, which is set in accordance with the detected value of the first SOC, if the amount of supplied power corresponding to the required output DM_dmd is less than or equal to the base amount of supplied power P2_base.

If the amount of supplied power corresponding to the required output DM_dmd is smaller than the base amount of supplied power P2_base, the amount of supplied power corresponding to the required output DM_dmd, which is included in the base amount of supplied power P2_base, is supplied from only the second energy storage device 6 to the electric motor 3 and, also, the amount of supplied power obtained by subtracting the amount of supplied power corresponding to the required output DM_dmd from the base amount of supplied power P2_base is provided to charge the first energy storage device 5. Thus, the first SOC can be gradually restored.

In this case, furthermore, the rate of charging of the first energy storage device 5 can be accurately adjusted by the power transmission controller 32 controlling the voltage converters 23 and 24. Accordingly, the first energy storage device 5 is charged at a low rate, resulting in the progression of deterioration of the first energy storage device 5 being suppressed more effectively than when the first energy storage device 5 is charged with the generated power output by the electric generator 4 by using the motive power of the internal combustion engine 2.

When the detected value of the first SOC falls within the high-SOC area, power is supplied preferentially from the first energy storage device 5 to the electric motor 3 if the required output DM_dmd is less than or equal to the threshold DM_th5.

Thus, the load placed on the second energy storage device 6 in the first CS mode can be reduced, and the second energy storage device 6 can be prevented from generating excessive heat.

Control Process during Regenerative Operation in First CS Mode

Next, a control process executed by the power transmission controller 32 during the regenerative operation of the electric motor 3 in the first CS mode will be described in detail hereinafter with reference to FIGS. 14 and 15.

FIG. 14 is a map that defines, in the first CS mode, how the regenerative power output by the electric motor 3 during the regenerative operation is shared in order to charge the first energy storage device 5 and the second energy storage device 6 in accordance with the required amount of regeneration G_dmd of the electric motor 3 and the first SOC (the first SOC in the range between the CD→CS switching threshold B1_mc1 and the CS→CD switching threshold B1_mc2).

In FIG. 14, a diagonally hatched area represents an area where all or part of the regenerative power generated by the electric motor 3 is used to charge the first energy storage device 5, and a shaded area represents an area where all or part of the regenerative power is used to charge the second energy storage device 6.

On the map illustrated in FIG. 14, G_max2 is a maximum value of the required amount of regeneration G_dmd in the first CS mode. The maximum value G_max2 is a constant value when the first SOC is an SOC less than or equal to a predetermined value B1e that is slightly smaller than the CS→CD switching threshold B1_mc2. When the first SOC is larger than the value B1e, the maximum value G_max2 decreases in accordance with the increase in the first SOC.

Figure 15:
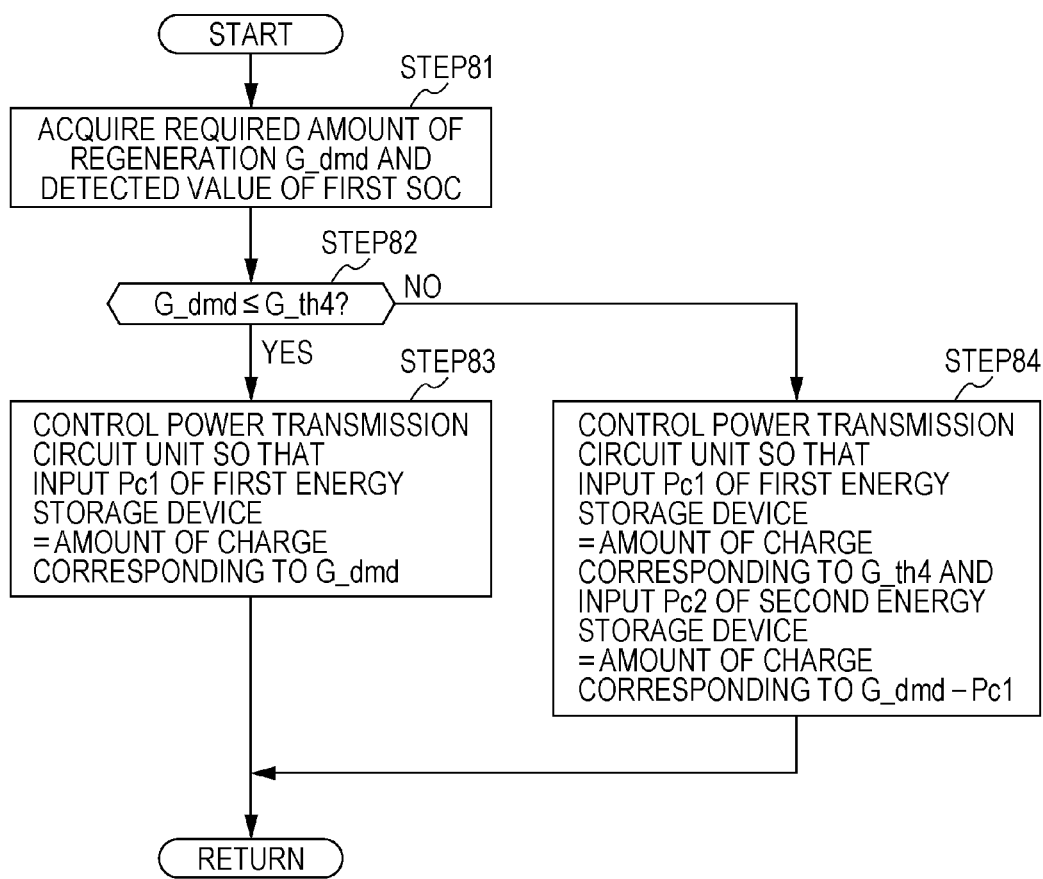
FIG. 15 is a flowchart illustrating a control process during the regenerative operation of the electric motor in the first CS mode.

A control process for the power transmission controller 32 during the regenerative operation of the electric motor 3 in the first CS mode is sequentially executed in a predetermined control process cycle by using the map illustrated in FIG. 14 in accordance with a flowchart illustrated in FIG. 15.

In STEP81, the power transmission controller 32 acquires the required amount of regeneration G_dmd and a detected value of the first SOC.

Then, in STEP82, the power transmission controller 32 determines whether or not the required amount of regeneration G_dmd is less than or equal to a predetermined threshold G_th4.

In this embodiment, the threshold G_th4 is set in accordance with the first SOC. Specifically, as exemplified in FIG. 14, the threshold G_th4 is set to a predetermined constant value when the first SOC is an SOC less than or equal to the predetermined value B1e. The constant value is determined to be a comparatively small value so as to allow the first energy storage device 5 to be charged at a low rate (low speed) to minimize the progression of deterioration of the first energy storage device 5.

When the first SOC is larger than the predetermined value B1e, the threshold G_th4 is set to successively decrease from the constant value to zero in accordance with the decrease in the first SOC (and to reach zero at the CS→CD switching threshold B1_mc2).

The determination result of STEP82 is affirmative for the diagonally hatched area illustrated in FIG. 14. In this situation, in STEP83, the power transmission controller 32 controls the voltage converter 23 and the inverter 21 of the power transmission circuit unit 7 so that the input Pc1 of the first energy storage device 5 matches the amount of charge corresponding to the required amount of regeneration G_dmd. In this case, the voltage converter 24 on the second energy storage device 6 side is controlled to block charging of the second energy storage device 6.

On the other hand, the determination result of STEP82 is negative for the shaded area illustrated in FIG. 14. In this situation, in STEP84, the power transmission controller 32 controls the voltage converters 23 and 24 and the inverter 21 of the power transmission circuit unit 7 so that the input Pc1 of the first energy storage device 5 matches the amount of charge corresponding to the threshold G_th4 and so that the input Pc2 of the second energy storage device 6 matches the amount of charge obtained by subtracting the input Pc1 of the first energy storage device 5 from the amount of charge corresponding to the required amount of regeneration G_dmd.

The control process during the regenerative operation of the electric motor 3 in the first CS mode is executed in the way described above. This control process allows the first energy storage device 5 to be preferentially charged with regenerative power if the required amount of regeneration G_dmd is less than or equal to the threshold G_th4. In addition, the amount of charge to the first energy storage device 5 is limited to a value less than or equal to the amount of charge corresponding to the threshold G_th4. This can restore the first SOC while minimizing the progression of deterioration of the first energy storage device 5.

Control Process for Second CS Mode

Next, the control process for the second CS mode in STEP8 will be described in detail with reference to FIGS. 16 to 20.

The control device 8 determines a required driving force (required propulsion force) or required braking force of the entire vehicle in a way similar to that in the CD mode, and also determines the respective target operating states of the internal combustion engine 2, the electric motor 3, the electric generator 4, the clutch 11, and the brake device.

In the second CS mode, the control device 8 causes the internal combustion engine operation controller 31 to control the internal combustion engine 2 to successively perform the operation of the internal combustion engine 2. In addition to this, the control device 8 causes the power transmission controller 32 to control the electric generator 4 to continuously perform the power generation operation of the electric generator 4, except during the rotation operation of the electric motor 3. In this case, the power transmission controller 32 controls the voltage converter 24 and the inverter 22 of the power transmission circuit unit 7 so that only the second energy storage device 6, out of the first energy storage device 5 and the second energy storage device 6, is charged with the generated power corresponding to the target value.

In the vehicle driving request state (in the state where the required driving force is not zero), the control device 8 determines the respective shares of the required driving force of the entire vehicle that are undertaken by the electric motor 3 and the internal combustion engine 2 in accordance with the required driving force of the entire vehicle, the detected value of the first SOC, and so on.

In this case, the respective shares undertaken by the electric motor 3 and the internal combustion engine 2 are determined so that, basically, the required driving force is provided entirely or mostly by the internal combustion engine 2 whereas the electric motor 3 serves as an auxiliary.

The control device 8 causes the internal combustion engine operation controller 31 to perform control so that the motive power (output torque) of the internal combustion engine 2 is equal to motive power including the motive power corresponding to the share of the required driving force which is undertaken by the internal combustion engine 2 and the motive power necessary for the power generation operation of the electric generator 4, and also causes the clutch controller 33 to control the clutch 11 to enter the connected state.

Further, the control device 8 determines the required output DM_dmd of the electric motor 3 so that the share of the required driving force which is undertaken by the electric motor 3 is realized by the motive power generated through the power-running operation of the electric motor 3.

Figure 16:
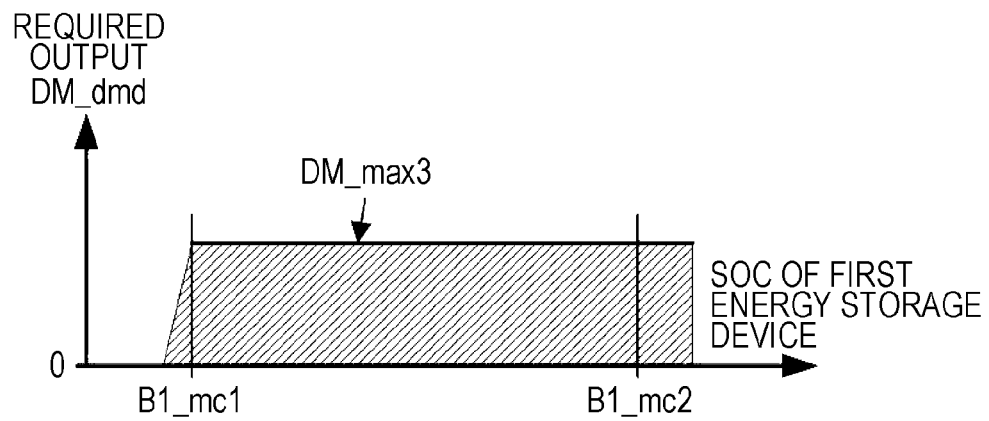
FIG. 16 illustrates a map used in a control process when power is supplied to the electric motor in a second CS mode.

Then, the control device 8 causes the power transmission controller 32 to control the inverter 21 on the electric motor 3 side and the voltage converter 23 of the power transmission circuit unit 7 to supply power from only the first energy storage device 5 to the electric motor 3 in accordance with a pre-created map illustrated in FIG. 16 on the basis of the required output DM_dmd and the detected value of the SOC of the first energy storage device 5 (i.e., the first SOC).

In the vehicle braking request state (in the state where the required braking force is not zero), the control device 8 determines the respective shares of the required braking force of the entire vehicle that are undertaken by the electric motor 3 and the brake device. In this case, the control device 8 determines the respective shares undertaken by the electric motor 3 and the brake device on the basis of the magnitude of the required braking force, the detected value of the first SOC, and so on so that the share of the required braking force which is undertaken by the electric motor 3 generally becomes as high as possible.

Then, the control device 8 causes the brake controller 34 to control the brake device in accordance with the share of the required braking force that is undertaken by the brake device.

Further, the control device 8 determines the required amount of regeneration G_dmd of the electric motor 3 so that the share of the required braking force which is undertaken by the electric motor 3 is realized by the regenerative braking force generated through the regenerative operation of the electric motor 3.

Figure 18:
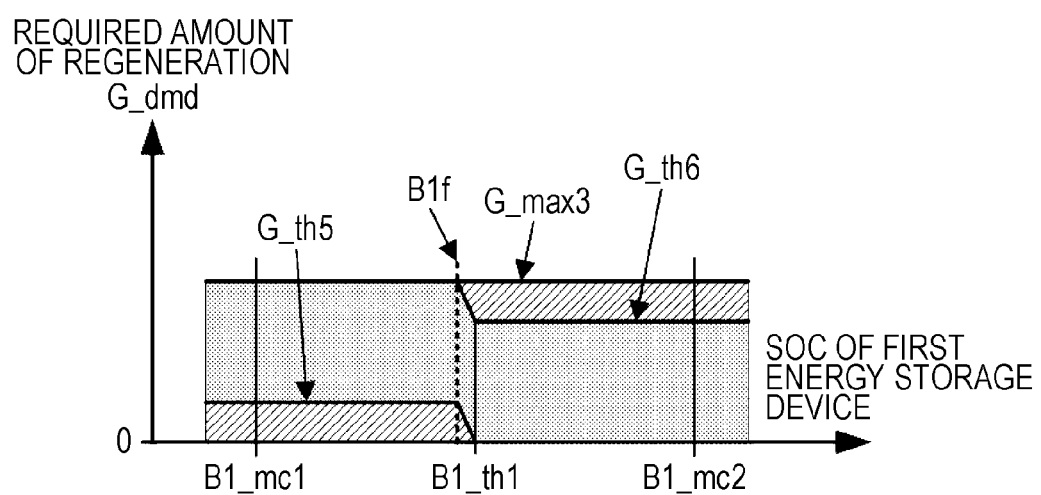
FIG. 18 illustrates a map used in a control process during the regenerative operation of the electric motor in the second CS mode.

Then, the control device 8 causes the power transmission controller 32 to control the inverter 21 on the electric motor 3 side and the voltage converters 23 and 24 of the power transmission circuit unit 7 to charge either or both of the first energy storage device 5 and the second energy storage device 6 with the regenerative power output from the electric motor 3 in accordance with a pre-created map illustrated in FIG. 18 on the basis of the required amount of regeneration G_dmd and the detected value of the first SOC. In this embodiment, the main energy storage device to be charged with the regenerative power in the second CS mode is the second energy storage device 6.

Control Process During Power-Running Operation in Second CS Mode

A control process executed by the power transmission controller 32 during the power-running operation of the electric motor 3 in the second CS mode will be described in detail hereinafter with reference to FIGS. 16 and 17.

FIG. 16 illustrates a map depicting how the first energy storage device 5 and the second energy storage device 6 output power to meet the demand for the amount of electricity (the amount of supplied power) to be supplied to the electric motor 3 in the second CS mode in accordance with the required output DM_dmd of the electric motor 3 and the first SOC.

In FIG. 16, a diagonally hatched area represents an area where all the amount of supplied power to the electric motor 3 is provided by the first energy storage device 5. On the map illustrated in FIG. 16, DM_max3 is a maximum value of the required output DM_dmd in the second CS mode. The maximum value DM_max1 is a constant value.

In the control process during the power-running operation of the electric motor 3 in the second CS mode, as illustrated in FIG. 16, the amount of supplied power to the electric motor 3 within the entire range between the CD→CS switching threshold B1_mc1 (see FIG. 2) and the CS→CD switching threshold B1_mc2 (see FIG. 2) for the first SOC is always provided by only the first energy storage device 5. In the second CS mode, accordingly, power supply from the second energy storage device 6 to the electric motor 3 is prohibited.

Figure 17:
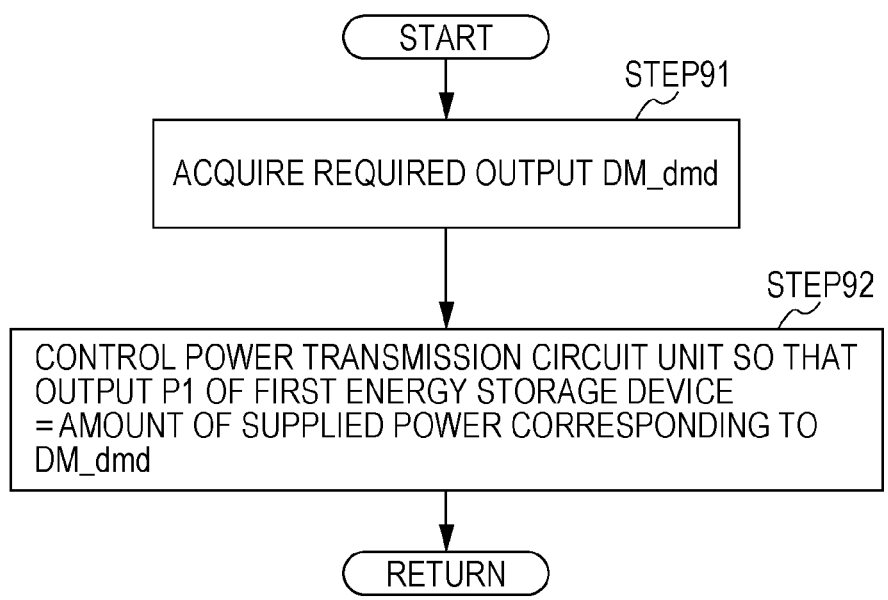
FIG. 17 is a flowchart illustrating a control process when power is supplied to the electric motor in the second CS mode.

The control process for the power transmission controller 32 during the power-running operation of the electric motor 3 in the second CS mode is sequentially executed in a predetermined control process cycle in accordance with a flowchart illustrated in FIG. 17.

In STEP91, the power transmission controller 32 acquires the required output DM_dmd. Then, in STEP92, the power transmission controller 32 controls the voltage converter 23 and the inverter 21 of the power transmission circuit unit 7 so that the output P1 of the first energy storage device 5 matches the amount of supplied power corresponding to the required output DM_dmd.

The control process during the power-running operation of the electric motor 3 in the second CS mode is executed in the way described above. In this control process, power supply from the second energy storage device 6 to the electric motor 3 is prohibited. Thus, the SOC of the second energy storage device 6 can be quickly restored with the generated power of the electric generator 4.

Control Process During Regenerative Operation in Second CS Mode

Next, a control process executed by the power transmission controller 32 during the regenerative operation of the electric motor 3 in the second CS mode will be described in detail hereinafter with reference to FIGS. 18 and 19.

FIG. 18 is a map that defines, in the second CS mode, how the regenerative power output by the electric motor 3 during the regenerative operation is shared in order to charge the first energy storage device 5 and the second energy storage device 6 in accordance with the required amount of regeneration G_dmd of the electric motor 3 and the first SOC (the first SOC in the range between the CD→CS switching threshold B1_mc1 and the CS→CD switching threshold B1_mc2).

In FIG. 18, diagonally hatched areas represent areas where all or part of the regenerative power generated by the electric motor 3 is used to charge the first energy storage device 5, and a shaded area represents an area where all or part of the regenerative power is used to charge the second energy storage device 6.

On the map illustrated in FIG. 18, G_max3 is a maximum value of the required amount of regeneration G_dmd in the second CS mode. The maximum value G_max3 is a constant value.

Figure 19:
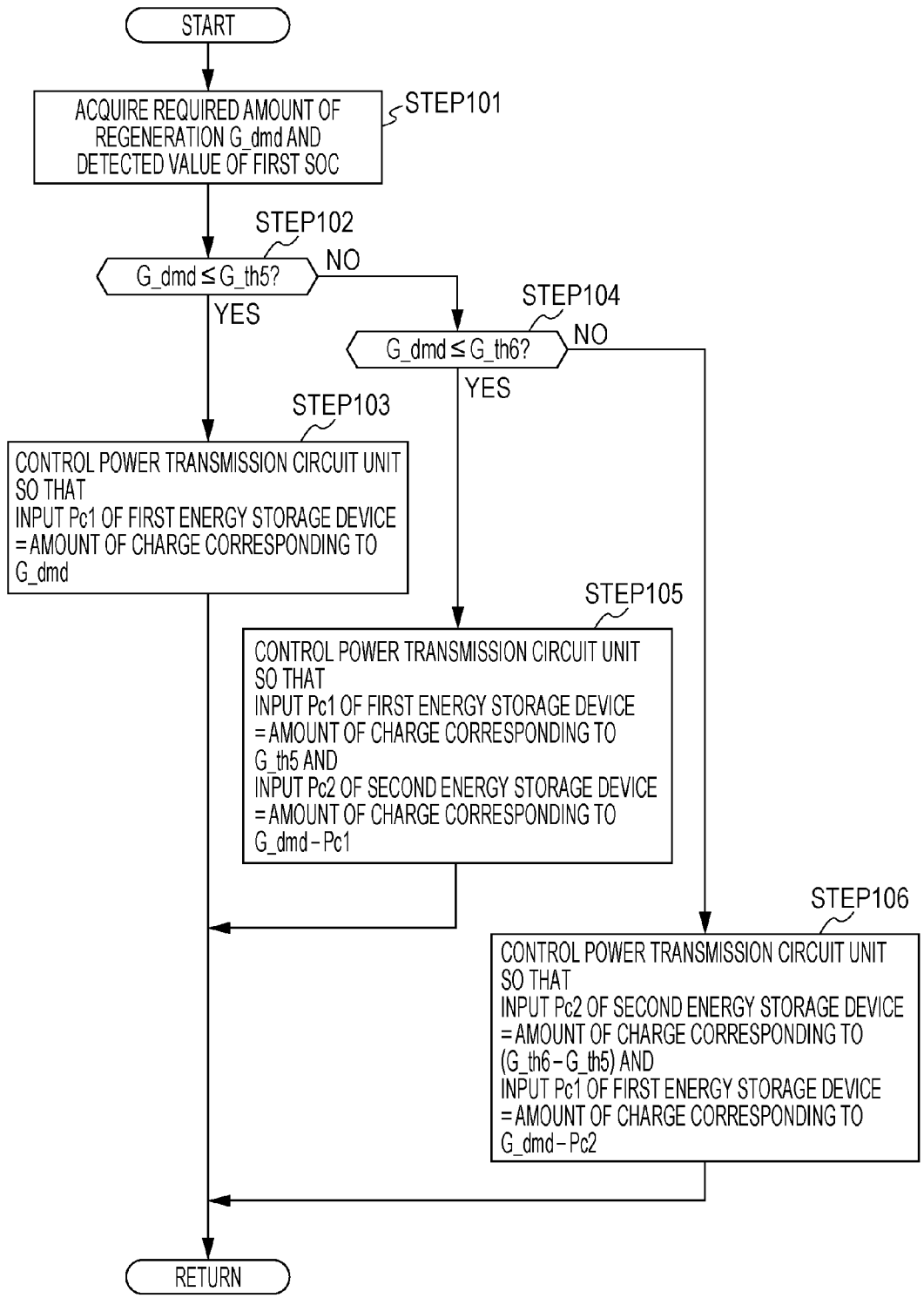
FIG. 19 is a flowchart illustrating a control process during the regenerative operation of the electric motor in the second CS mode.

A control process for the power transmission controller 32 during the regenerative operation of the electric motor 3 in the second CS mode is sequentially executed in a predetermined control process cycle by using the map illustrated in FIG. 18 in accordance with a flowchart illustrated in FIG. 19.

In STEP101, the power transmission controller 32 acquires the required amount of regeneration G_dmd and a detected value of the first SOC.

Then, in STEP102, the power transmission controller 32 determines whether or not the required amount of regeneration G_dmd is less than or equal to a predetermined threshold G_th5.

In this embodiment, the threshold G_th5 is set in accordance with the first SOC. Specifically, as exemplified in FIG. 18, the threshold G_th5 is set to a predetermined constant value when the first SOC is an SOC less than or equal to a predetermined value E1f that is slightly smaller than the threshold B1_th1. The constant value is determined to be a comparatively small value so as to allow the first energy storage device 5 to be charged at a low rate (low speed) to minimize the progression of deterioration of the first energy storage device 5.

When the first SOC is larger than the predetermined value B1f, the threshold G_th5 is set to successively decrease from the constant value to zero in accordance with the increase in the first SOC (and to reach zero at the threshold B1_th1). When the first SOC is an SOC greater than or equal to the threshold B1_th1, the threshold G_th5 is kept at zero.

The determination result of STEP102 is affirmative for the lower diagonally hatched area illustrated in FIG. 18. In this situation, in STEP103, the power transmission controller 32 controls the voltage converter 23 and the inverter 21 of the power transmission circuit unit 7 so that the input Pc1 of the first energy storage device 5 matches the amount of charge corresponding to the required amount of regeneration G_dmd. In this case, the voltage converter 24 on the second energy storage device 6 side is controlled to block charging of the second energy storage device 6.

For additional explanation, when the detected value of the first SOC is greater than or equal to the threshold B1_th1, the threshold G_th5 is zero and thus no affirmative determination is made in STEP102. Thus, in this case, the processing of STEP103 is not executed.

If the determination result of STEP102 is negative, then, in STEP104, the power transmission controller 32 determines whether or not the required amount of regeneration G_dmd is less than or equal to a predetermined threshold G_th6.

In this embodiment, the threshold G_th6 is set in accordance with the first SOC in a way similar to that for the threshold G_th5 in STEP102 described above. Specifically, as exemplified in FIG. 18, when the first SOC is an SOC greater than or equal to the threshold B1_th1, the threshold G_th6 is set to a predetermined constant value. The constant value is set so that the amount of charge corresponding to the difference between the threshold G_th6 and the maximum value G_max3 of the required amount of regeneration G_dmd (=G_max3−G_th6) matches the amount of charge corresponding to the maximum value of the threshold G_th5 (the value of the threshold G_th5 when the first SOC is less than or equal to the threshold B1f) (the amount of charge by which the first energy storage device 5 can be charged at a low rate).

When the first SOC is smaller than the threshold B1_th1, the threshold G_th6 is set to increase to the maximum value G_max3 in accordance with the decrease in the first SOC in a pattern similar to the pattern in which the threshold G_th5 changes (and to reach the maximum value G_max3 at the threshold B1f). When the first SOC is less than or equal to the threshold B1f, the threshold G_th6 is maintained at the maximum value G_max3.

The thresholds G_th5 and G_th6 are set so that, within the range of B1f to B1_th1 of the first SOC, the sum of the amount of charge corresponding to the difference between the maximum value G_max3 and the threshold G_th6

(=G_max3−G_th6) and the amount of charge corresponding to the threshold G_th5 matches the amount of charge corresponding to the maximum value of the threshold G_th5 (the amount of charge by which the first energy storage device 5 can be charged at a low rate).

The determination result of STEP104 is affirmative for the shaded area illustrated in FIG. 18. In this situation, in STEP105, the power transmission controller 32 controls the voltage converters 23 and 24 and the inverter 21 of the power transmission circuit unit 7 so that the input Pc1 of the first energy storage device 5 matches the amount of charge corresponding to the threshold G_th5 and so that the input Pc2 of the second energy storage device 6 matches the amount of charge obtained by subtracting the input Pc1 of the first energy storage device 5 from the amount of charge corresponding to the required amount of regeneration G_dmd.

On the other hand, the determination result of STEP104 is negative for the upper diagonally hatched area illustrated in FIG. 18. In this situation, in STEP106, the power transmission controller 32 controls the voltage converters 23 and 24 and the inverter 21 of the power transmission circuit unit 7 so that the input Pc2 of the second energy storage device 6 matches the amount of charge corresponding to the difference between the thresholds G_th5 and G_th6 (=G_th6−G_th5) and so that the input Pc1 of the first energy storage device 5 matches the amount of charge obtained by subtracting the input Pc2 of the second energy storage device 6 from the amount of charge corresponding to the required amount of regeneration G_dmd.

For additional explanation, when the first SOC is less than or equal to the predetermined value B1$f$, the threshold G_th6 matches the maximum value G_max1 and thus no negative determination is made in STEP104. Thus, in this case, the processing of STEP106 is not executed.

The control process during the regenerative operation of the electric motor 3 in the second CS mode is executed in the way described above. In this control process, when the detected value of the first SOC is larger than the threshold B1_th1, the second energy storage device 6 is charged with all or a large portion of the regenerative power. Thus, the SOC of the second energy storage device 6 can be effectively restored with regenerative power.

In the second CS mode, the second energy storage device 6 is charged with generated power that is produced by the electric generator 4, except during the regenerative operation of the electric motor 3. Both the generated power and the regenerative power can be used to quickly restore the SOC of the second energy storage device 6 toward the CS2→CS1 switching threshold B2_mc2.

When the detected value of the first SOC is smaller than the threshold B1_th1, the first energy storage device 5 is preferentially charged with regenerative power within the range where the required amount of regeneration G_dmd is less than or equal to the threshold G_th5. Further, when the detected value of the first SOC is larger than the predetermined value B1$f$, the first energy storage device 5 is charged with regenerative power within the range where the required amount of regeneration G_dmd is greater than or equal to the threshold G_th6. The amount of charge to the first energy storage device 5 is limited to a value less than or equal to the amount of charge corresponding to the maximum value of the threshold G_th5. This can suppress a reduction in the first SOC in the second CS mode while minimizing the progression of deterioration of the first energy storage device 5.

A detailed description has been made of the control process for the control device 8 in this embodiment.

The correspondences between this embodiment and the present disclosure will now be briefly explained below. In this embodiment, the first CS mode and the second CS mode correspond to a first mode and a second mode in the present disclosure, respectively.

In addition, the base amount of supplied power P1_base output from the first energy storage device 5 in the CD mode corresponds to a first base amount of supplied power in the present disclosure, and the base amount of supplied power P2_base output from the second energy storage device 6 in the first CS mode corresponds to a second base amount of supplied power in the present disclosure.

In the embodiment described above, the range of the first SOC (the range of B1$a$ (%) to B1$b$ (%) illustrated in FIG. 2) used for supplying power to the electric motor 3 in the CD mode is larger than the range of the second SOC (the range of B2$a$ (%) to B2$b$ (%) illustrated in FIG. 2) used for supplying power to the electric motor 3 in the CD mode. Furthermore, the range of the second SOC (the range of B2$b$ (%) to B2$c$ (%) illustrated in FIG. 2) used for supplying power to the electric motor 3 in the CS mode is larger than the range of the first SOC (part of the range less than or equal to B1$b$ (%) illustrated in FIG. 2) used for supplying power to the electric motor 3 in the CS mode.

In addition, electric power to be supplied to the electric generator 4, which serves as a starter actuator, when the internal combustion engine 2 is started in the CS mode is reserved in only the second energy storage device 6.

For this reason, a large portion of the electric power (stored energy) in the first energy storage device 5 with relatively high energy density can be utilized as electric power that is supplied to the electric motor 3 in the CD mode. As a result, the period during which power can be supplied from the first energy storage device 5 to the electric motor 3 in the CD mode, and therefore the drivable range of the vehicle in the CD mode in which fuel consumption of the internal combustion engine 2 does not occur or is reduced, can be maximized. In addition, the environmental performance of the motive power system 1 is improved.

Additionally, part of the electric power in the second energy storage device 6 (the stored energy within the range of B2$a$ (%) to B2$b$ (%) illustrated in FIG. 2) is usable as dedicated electric power to be supplied to the electric motor 3 in the CD mode, and can thus be supplied as an auxiliary from the second energy storage device 6 with relatively high power density to the electric motor 3, as necessary. Hence, the running performance of the vehicle (the driving performance of the drive wheel DW) in the CD mode can be enhanced.

In the first CS mode within the CS mode, the second energy storage device 6 can be used as the main power supply for the electric motor 3. Thus, the motive power of the electric motor 3 can be transmitted as an auxiliary to the drive wheel DW with high responsivity to a change in the required driving force of the vehicle. As a result, the running performance of the vehicle (the driving performance of the drive wheel DW) in the first CS mode can be enhanced.

In addition, part of the electric power in the first energy storage device 5 (part of the range less than or equal to B1$b$ (%) illustrated in FIG. 2) is usable as electric power to be supplied to the electric motor 3 in the CS mode. Thus, in particular, in the second CS mode, power can be supplied from the first energy storage device 5, instead of the second energy storage device 6, to the electric motor 3, as necessary. This can eliminate power supply from the second energy storage device 6 to the electric motor 3 in the second CS mode. Thus, restoration of the SOC of the second energy storage device 6 in the second CS mode can be accelerated.

In this embodiment, furthermore, in the second CS mode, the generated power of the electric generator 4 is used to charge only the second energy storage device 6. Part of the electric power used to charge the second energy storage device 6 in this manner is transferred from the second energy storage device 6 to the first energy storage device 5 in the first CS mode. In this case, in the first CS mode, the first energy storage device 5 can be charged stably at a low rate. This can minimize the progression of deterioration of the first energy storage device 5.

Figure 20:
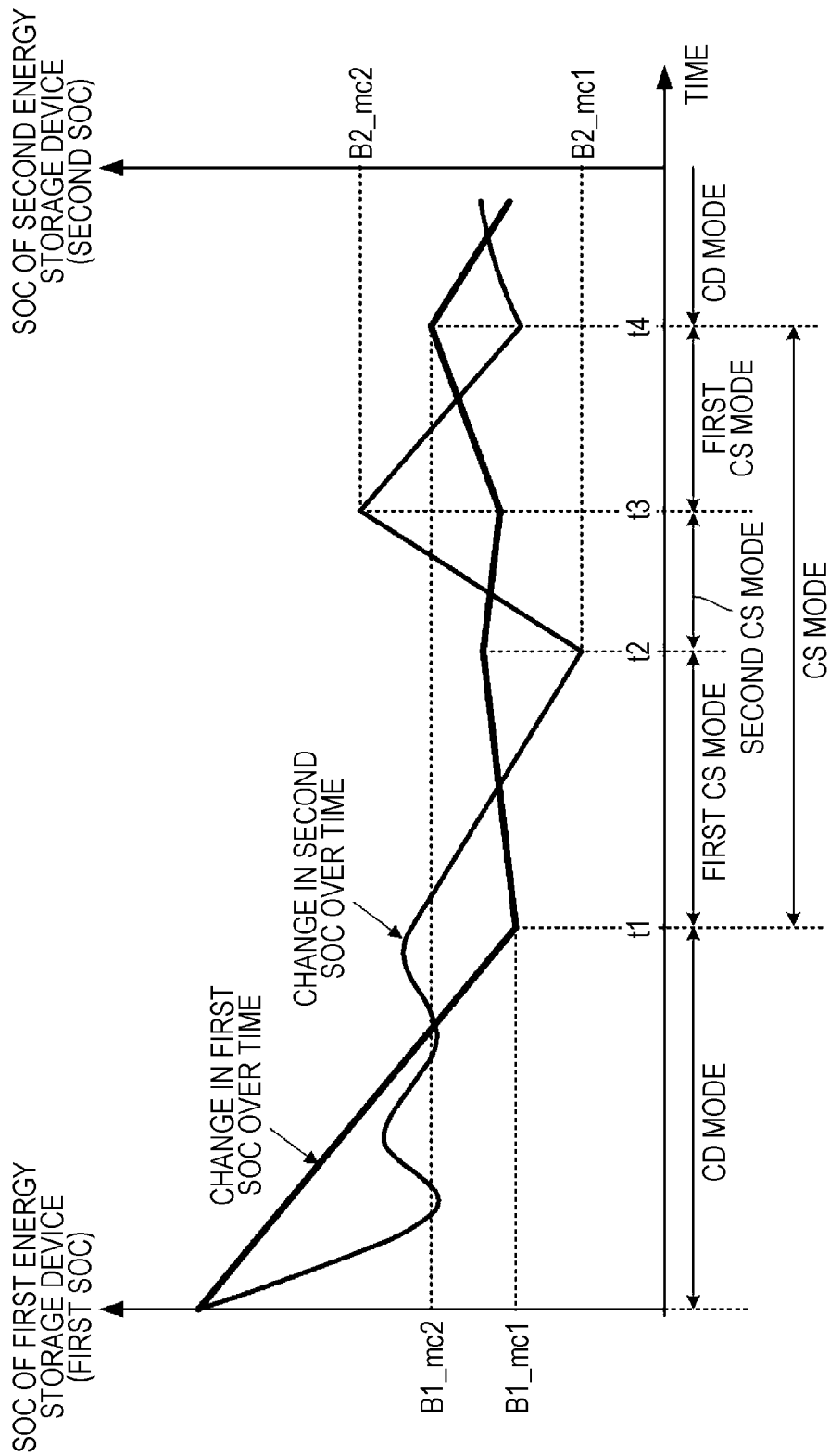
FIG. 20 is a graph exemplifying patterns in which the respective states of charge (SOCs) of the first energy storage device and the second energy storage device change over time.

FIG. 20 is a graph exemplifying schematic changes in the respective SOCs of the first energy storage device 5 and the second energy storage device 6 over time during the travel of the vehicle.

The period up to time t1 is the period of the CD mode. During this period, the first SOC generally decreases. The second SOC changes in response to the second energy storage device 6 being discharged and charged as appropriate.

When the first SOC decreases to the CD→CS switching threshold B1_mc1 at time t1, the mode of the control process for the control device 8 is switched to the first CS mode. The period from time t1 to time t2 is the period of the first CS mode. During the period of the first CS mode, the second SOC generally decreases since power is supplied to either or both of the first energy storage device 5 and the electric motor 3. The first SOC is gradually restored since by the first energy storage device 5 is appropriately charged with power provided from the second energy storage device 6.

When the second SOC decreases to the CS1→CS2 switching threshold B2_mc1 at time t2, the mode of the control process for the control device 8 is switched to the second CS mode. The period from time t2 to time t3 is the period of the second CS mode. During the period of the second CS mode, the second SOC increases in response to the second energy storage device 6 being charged with generated power and regenerative power.

In the second CS mode, the first SOC decreases in a situation where power is supplied from the first energy storage device 5 to the electric motor 3. In the second CS mode, however, since the second SOC is quickly restored with the generated power and the regenerative power, power supply from the first energy storage device 5 to the electric motor 3 is not frequently required in most cases. In most cases, therefore, the first SOC is not much reduced in the second CS mode.

When the second SOC is restored to the CS2→CS1 switching threshold B2_mc2 at time t3, the mode of the control process for the control device 8 is switched to the first CS mode again. The period from time t3 to time t4 is the period of the first CS mode. During the period of the first CS mode, as in the period from time t1 to time t2, the second SOC decreases in response to power supply to either or both of the first energy storage device 5 and the electric motor 3, whereas the first SOC is gradually restored.

In the illustrated example, at time t4, the first SOC is restored to the CS→CD switching threshold B1_mc2. In response to the restoration, the mode of the control process for the control device 8 is returned to the CD mode.

As described above, in the CS mode subsequent to the CD mode, basically, alternate repetition of the first CS mode and the second CS mode can gradually restore the first SOC. As a result, the travel of the vehicle can be restarted in the CD mode in which only the motive power of the electric motor 3 is used to drive the drive wheel DW.

Modifications

There will now be described some modifications related to the embodiment described above.

In the embodiment described above, electric power for causing the electric generator 4 to operate as a starter actuator is provided by only the second energy storage device 6. Alternatively, part of the electric power to be supplied to the electric generator 4 may also be provided by the first energy storage device 5. In this case, it is desirable that the load placed on the first energy storage device 5 be less than the load placed on the second energy storage device 6.

For utmost utilization of the electric power in the first energy storage device 5 in the CD mode, it is desirable that all the electric power to be supplied to the electric generator 4 be provided by the second energy storage device 6.

In the embodiment described above, furthermore, power is supplied from only the first energy storage device 5 to the electric motor 3 (discharge from the second energy storage device 6 is prohibited) during the power-running operation of the electric motor 3 in the second CS mode. However, for example, when the required output DM_dmd is large, the amount of supplied power corresponding to part of the required output DM_dmd may be supplied from the second energy storage device 6 to the electric motor 3.

In the embodiment, furthermore, in the CD mode, the operation of the internal combustion engine 2 is prohibited and only the motive power of the electric motor 3 is used as motive power for driving the drive wheel DW. However, in the CD mode, for example, when the required driving force of the vehicle is high, part of the required driving force of the vehicle may be provided by the internal combustion engine 2 as an auxiliary.

In the description of the embodiment described above, a transportation apparatus including the motive power system 1 is a hybrid vehicle, by way of example. The transportation apparatus is not limited to a vehicle and may be a ship, a railway carriage, or any other apparatus. The target load may not necessarily be the drive wheel DW of a vehicle. The actuator may be an actuator other than an electric motor.

According to an embodiment of the present disclosure, a motive power system includes a first energy storage device, a second energy storage device having a higher power density and a lower energy density than the first energy storage device, an actuator that outputs motive power for driving a target load in response to power supplied from at least one of the first energy storage device and the second energy storage device, an internal combustion engine that outputs motive power for driving the target load, a power transmission circuit unit having a function of performing power transmission among the first energy storage device, the second energy storage device, and the actuator, and a control device having a function of controlling the power transmission circuit unit by using a charge-depleting (CD) mode and a charge-sustaining (CS) mode. The CD mode is a mode in which at least the motive power of the actuator is usable as motive power for driving the target load so that a total stored energy of the first energy storage device and the second energy storage device is consumed. The CS mode is a mode in which at least the motive power of the internal combustion engine is usable as motive power for driving the target load so that the total stored energy of the first energy storage device and the second energy storage device is less consumed than in the CD mode. The control device is configured to control the power transmission circuit unit in the CD mode in a manner corresponding to a second charge rate that is a charge rate of the second energy storage device, and control the power transmission circuit unit in the CS mode in a manner corresponding to a first charge rate that is a charge rate of the first energy storage device (a first aspect of the present disclosure).

In the present disclosure, a "power transmission circuit unit" having a function of performing power transmission among the first energy storage device, the second energy storage device, and the actuator refers to a "power transmission circuit unit" having at least a function capable of controlling the amount of supplied power that is provided from each of the first energy storage device and the second energy storage device to the actuator or having, in addition to the function described above, a function capable of performing selective switching control of the source and destination of electric power among the first energy storage device, the second energy storage device, and the actuator.

The "amount of supplied power" refers to the amount of electricity that is supplied from the first energy storage device or the second energy storage device to the target to be supplied with electric power. The target to be supplied with electric power is not limited to the actuator and may be an energy storage device (the first energy storage device or the second energy storage device). The "amount of electricity" or the "amount of supplied power" is expressed as an amount of electrical energy per unit time (e.g., an electric power value), or an amount of electric charge per unit time (e.g., an electric current value), for example.

According to the first aspect of the present disclosure, the CD mode is a mode in which at least the motive power of the actuator is usable as motive power for driving the target load so that the total stored energy of the first energy storage device and the second energy storage device is consumed (in other words, a mode in which the actuator is used as a main motive power source). Hence, the CD mode is a mode in which the first energy storage device having a relatively high energy density is preferably used as a main power supply for the actuator.

In the CD mode, the control device controls the power transmission circuit unit in a manner corresponding to the second charge rate. This enables the electric power (stored energy) of the second energy storage device with relatively high power density to be supplied as an auxiliary to the actuator so as to suppress the charge rate of the second energy storage device from becoming excessive or insufficient (too high or too low). As a result, the progression of deterioration of the second energy storage device whose deterioration is likely to progress when the charge rate is excessive or insufficient can be suppressed as much as possible. In addition, it is possible to prevent excessive reduction of the charge rate of the second energy storage device before a transition to the CS mode.

In the CD mode, furthermore, power supply to the actuator can be implemented by the second energy storage device as an auxiliary, if necessary. Thus, the period during which power can be continuously supplied from the first energy storage device with relatively high energy density to the actuator can be increased as much as possible. In addition, the amount of supplied power that is output from the first energy storage device can be prevented from frequently changing. Therefore, the progression of deterioration of the first energy storage device can be minimized.

In contrast, the CS mode is a mode in which at least the motive power of the internal combustion engine is usable as motive power for driving the target load so that the total stored energy of the first energy storage device and the second energy storage device is less consumed than in the CD mode. Hence, the CS mode is a mode in which the motive power of the actuator can be used as auxiliary motive power for driving the target load. In other words, the CS mode is a mode in which the actuator provides less motive power for driving the target load (i.e., the magnitude of the motive power to be output from the actuator is smaller or the period during which the motive power is necessary is shorter) than in the CD mode.

Thus, for a certain period at least after the transition from the CD mode to the CS mode, a large proportion of the electric power necessary to generate the motive power of the actuator can be supplied from the second energy storage device to the actuator even if the charge rate of the first energy storage device becomes comparatively low. That is, the second energy storage device can be used as a main power supply for the actuator. It is also possible to use the electric power (stored energy) of the first energy storage device, as appropriate, if the charge rate of the first energy storage device does not become excessively low.

In the CS mode, accordingly, the control device controls the power transmission circuit unit in a manner corresponding to the first charge rate. In the CS mode, therefore, for a certain period at least after the transition from the CD mode, the required electric power can be supplied to the actuator from the second energy storage device or from both the first energy storage device and the second energy storage device so as to prevent the charge rate of the first energy storage device from becoming excessively low or prevent an excessive load from being imposed on the second energy storage device.

In the CS mode, furthermore, the actuator can output auxiliary motive power to the target load. This can realize not only suppression of excessive fuel consumption of the internal combustion engine but also reduction in the displacement of the internal combustion engine.

Accordingly, the motive power system according to the first aspect of the present disclosure enables accurate driving of a target load by using a CD mode and a CS mode with the appropriate use of electric power of two energy storage devices having different characteristics.

In the first aspect of the present disclosure, more specifically, the control device may be configured to, when power is to be supplied to the actuator in the CD mode, determine an amount of supplied power that is output from the first energy storage device and an amount of supplied power that is output from the second energy storage device in accordance with the second charge rate and required output of the actuator and control the power transmission circuit unit to realize the determined amounts of supplied power, and, when power is to be supplied to the actuator in the CS mode, determine an amount of supplied power that is output from the first energy storage device and an amount of supplied power that is output from the second energy storage device in accordance with the first charge rate and required output of the actuator and control the power transmission circuit unit to realize the determined amounts of supplied power (a second aspect of the present disclosure).

The "required output" of the actuator refers to the requirement that specifies a request value of the amount of electricity necessary to activate the actuator. A request value of the amount of electricity or a request value of the mechanical output (e.g., the driving force or the amount of output energy per unit time) of the actuator can also be used as the "required output" of the actuator.

According to the second aspect of the present disclosure, in the CD mode, it is possible to supply power from either or both of the first energy storage device and the second energy storage device to the actuator in accordance with shares suitable for the charge rate of the second energy storage device (second charge rate) and the required output of the actuator. In the CS mode, it is possible to supply power from either or both of the first energy storage device and the second energy storage device to the actuator in accordance with shares suitable for the charge rate of the first energy storage device (first charge rate) and the required output of the actuator.

In the first or second aspect of the present disclosure, when the actuator is an actuator that is capable of performing a regenerative operation, preferably, the control device is configured to, during the regenerative operation of the actuator in the CD mode, determine an amount of regenerative power that is used to charge the first energy storage device and an amount of regenerative power that is used to charge the second energy storage device in accordance with the second charge rate and a required amount of regeneration of the actuator and control the power transmission circuit unit to realize the determined amounts of regenerative power, and, during the regenerative operation of the actuator in the CS mode, determine an amount of regenerative power that is used to charge the first energy storage device and an amount of regenerative power that is used to charge the second energy storage device in accordance with the first charge rate and a required amount of regeneration of the actuator and control the power transmission circuit unit to realize the determined amounts of regenerative power (a third aspect of the present disclosure).

The "required amount of regeneration" of the actuator refers to a value that defines the generated power produced by the actuator through a regenerative operation (regenerative power). For example, a request value of regenerative power (the amount of electrical energy generated per unit time) or a request value of the regenerative braking force produced by the actuator through the regenerative operation can also be used as the "required amount of regeneration".

According to the third aspect of the present disclosure, in the CD mode, it is possible to provide regenerative power to charge either or both of the first energy storage device and the second energy storage device in accordance with proportions suitable for the charge rate of the second energy storage device (second charge rate) and the required output of the actuator. In the CS mode, it is possible to provide regenerative power to charge either or both of the first energy storage device and the second energy storage device in accordance with proportions suitable for the charge rate of the first energy storage device (first charge rate) and the required output of the actuator.

In the first to third aspects of the present disclosure, preferably, the control device is configured to selectively execute a control process for any one of the CD mode and the CS mode in accordance with the first charge rate (a fourth aspect of the present disclosure).

This configuration allows switching between the CD mode and the CS mode in accordance with the charge rate of the first energy storage device that stores a main portion of the total stored energy which can be supplied from the first energy storage device and the second energy storage device to the actuator. As a result, switching between the CD mode and the CS mode can be performed at an appropriate timing.

In particular, it is preferable to, in view of suppression of deterioration of the first energy storage device and the second energy storage device with the use of their characteristics, control the power transmission circuit unit so that the first energy storage device is continuously discharged and the second energy storage device is instantaneously discharged or charged. In this case, switching between the CD mode and the CS mode in accordance with the charge rate of the first energy storage device, which approximately monotonously decreases, rather than in accordance with the charge rate of the second energy storage device, which is more likely to frequently increase or decrease, can suppress frequent repetitions of start and stop of the internal combustion engine.

In the first to fourth aspects of the present disclosure, preferably, the control device is configured to have a function of controlling the power transmission circuit unit to, when power is to be supplied to the actuator in the CD mode, while causing the first energy storage device to output a predetermined first base amount of supplied power, supply to the actuator an amount of supplied power corresponding to required output of the actuator, the amount of supplied power corresponding to the required output being included in the first base amount of supplied power, and charge the second energy storage device with an amount of supplied power equal to a difference obtained by subtracting the amount of supplied power corresponding to the required output from the first base amount of supplied power (a fifth aspect of the present disclosure).

The "amount of supplied power corresponding to the required output" refers to the amount of electricity to be supplied to the actuator to realize the required output.

According to this configuration, in the CD mode, it is possible to provide part of the stored energy of the first energy storage device to charge the second energy storage device, as appropriate, while supplying power to the actuator (and therefore outputting motive power from the actuator to the target load). As a result, in the CD mode, it is possible to appropriately prevent excessive reduction of the charge rate of the second energy storage device and also it is possible to suppress the progression of deterioration of the second energy storage device.

In a control process for supplying power to the actuator and charging the second energy storage device while causing the first energy storage device to output the first base amount of supplied power in the way described above, it is preferable to, in view of minimization of the progression of deterioration of the first energy storage device, control the power transmission circuit unit so that the degree to which the output (i.e., the first base amount of supplied power) of the first energy storage device changes in response to a change in the required output of the actuator is lower than the degree to which the input (the amount of charge) of the second energy storage device changes in response to a change in the required output of the actuator. For example, it is preferable to set the first base amount of supplied power regardless of the required output of the actuator (desirably, set the first base amount of supplied power to be variable in accordance with the second charge rate).

In the first to fifth aspects of the present disclosure, preferably, the control device is configured to have a function of controlling the power transmission circuit unit to, when power is to be supplied to the actuator in the CS mode, while causing the second energy storage device to output a predetermined second base amount of supplied power, supply to the actuator an amount of supplied power corresponding to required output of the actuator, the amount of supplied power corresponding to the required output being included in the second base amount of supplied power, and charge the first energy storage device with an amount of supplied power equal to a difference obtained by subtracting the amount of supplied power corresponding to the required output from the second base amount of supplied power (a sixth aspect of the present disclosure).

According to this configuration, in the CS mode, it is possible to provide part of the stored energy of the second energy storage device to charge the first energy storage device, as appropriate, while supplying power to the actuator (and therefore outputting motive power from the actuator to the target load).

In this case, the first energy storage device is charged by transferring electric power from the second energy storage device. This makes it possible to easily control the power transmission circuit unit to charge the first energy storage device at a low rate (low speed). In the CS mode, therefore, it is possible to restore the charge rate of the first energy storage device while suppressing the progression of deterioration of the first energy storage device with relatively high energy density.

In the first to sixth aspects of the present disclosure, preferably, the control device is configured to, in the CS mode, control the power transmission circuit unit by using a control process for a mode selected in accordance with the second charge rate from among a first mode and a second mode, the first mode and the second mode being different in terms of a manner in which the power transmission circuit unit is controlled, and a control process for the second mode is configured to include controlling the power transmission circuit unit in such a manner that discharge from the second energy storage device is suppressed compared with a control process for the first mode (a seventh aspect of the present disclosure).

According to this configuration, in the control process for the second mode, power supply from the second energy storage device to the electric load is more suppressed than in the control process for the first mode. This enables the electric power (stored energy) of the second energy storage device to be actively used in the first mode within the CS mode, whereas enabling the charge rate of the second energy storage device to be more easily restored in the second mode within the CS mode.

In this case, in the second mode, the process for restoring the charge rate of the second energy storage device may be, for example, a process for providing the regenerative power generated through the regenerative operation of the electric load to charge the second energy storage device or a process for charging the second energy storage device with power provided from the first energy storage device. If an electric generator is included, a process for providing the generated power of the electric generator to charge the second energy storage device can also be used.

In the CS mode, by selecting one of the first mode and the second mode in accordance with the second charge rate, it is possible to control the power transmission circuit unit by using a mode suitable for the amount of stored energy of the second energy storage device.

For example, when the second charge rate is reduced to a predetermined first switching threshold during the selection of the first mode, the second mode is selected (to switch from the first mode to the second mode), and when the second charge rate is increased to a predetermined second switching threshold higher than the first switching threshold during the selection of the second mode, the first mode is selected (to switch from the second mode to the first mode). This enables the target load to be driven in the CS mode while periodically restoring the second charge rate.

In particular, when the seventh aspect of the present disclosure is combined with the sixth aspect of the present disclosure, the regenerative power provided to charge the second energy storage device in the second mode or the generated power of the electric generator can be transferred from the second energy storage device to the first energy storage device in the first mode. In this case, electric power (stored energy) can be transferred from the first energy storage device to the second energy storage device at a low rate. Therefore, it is also possible to restore the charge rate of the first energy storage device in the CS mode while suppressing the progression of deterioration of the first energy storage device.

In the seventh aspect of the present disclosure, in order to suppress discharge from the second energy storage device in the second mode more than in the first mode, the control process for the second mode may be configured to include controlling the power transmission circuit unit so that, for example, the range of the required output that can be provided from the second energy storage device to the actuator is smaller than that in the control process for the first mode. Alternatively, the control process for the second mode may be configured to include controlling the power transmission circuit unit to prohibit discharging of the second energy storage device and to allow power supply from the first energy storage device to the electric load.

The motive power system according to the first to seventh aspect of the present disclosure may further include an electric generator that is capable of outputting generated power by using the motive power of the internal combustion engine, and the power transmission circuit unit may be configured to further have a function of performing power transmission between the electric generator and one of the first energy storage device, the second energy storage device, and the actuator. In this case, preferably, the control device is configured to further have a function of executing a power generation control process in the CS mode in accordance with at least the second charge rate. The power generation control process is a process for controlling the power transmission circuit unit to charge at least the second energy storage device, out of the first energy storage device and the second energy storage device, with the generated power of the electric generator (an eighth aspect of the present disclosure).

According to this configuration, it is possible to charge the second energy storage device with the generated power of the electric generator at a desired timing in accordance with the charge rate of the second energy storage device.

In the eighth aspect of the present disclosure, preferably, the control device is configured to execute the power generation control process in such a manner as to charge the second energy storage device with the generated power more preferentially than the first energy storage device (a ninth aspect of the present disclosure).

The progression of deterioration of the second energy storage device is less likely to occur than that of the first energy storage device if the second energy storage device with relatively high power density is charged at a comparatively high rate (high speed). Thus, the ninth aspect of the present disclosure enables the second energy storage device to be quickly charged with the generated power of the electric generator. That is, the charge rate of the second energy storage device can be quickly restored. As a result, it is possible to minimize the period during which the electric generator generates electric power by using the motive power of the internal combustion engine.

In particular, when the ninth aspect of the present disclosure is combined with the sixth aspect of the present disclosure, the generated power of the electric generator can be provided through the second energy storage device to charge the first energy storage device. In the charging of the first energy storage device with power provided through the second energy storage device, the charge rate can be easily adjusted. Hence, it is possible to indirectly charge the first energy storage device with the generated power while suppressing the progression of deterioration of the first energy storage device.

In the first to ninth aspects of the present disclosure described above, the actuator may be an electric motor, for example. The power transmission circuit unit may have a configuration including, for example, a voltage converter that converts an output voltage of at least one of the first energy storage device and the second energy storage device and outputs the resulting power, and an inverter that converts direct-current power input the first energy storage device, the second energy storage device, or the voltage converter into alternating-current power and supplies the alternating-current power to the electric load or the actuator.

According to another embodiment of the present disclosure, a transportation apparatus includes the motive power system according to the first to ninth aspects of the present disclosure (a tenth aspect of the present disclosure). This transportation apparatus can implement a transportation apparatus that offers the advantages described above in conjunction with the first to ninth aspects of the present disclosure.

According to still another embodiment of the present disclosure, there is provided a power transmission method for a motive power system. The motive power system includes a first energy storage device, a second energy storage device having a higher power density and a lower energy density than the first energy storage device, an actuator that outputs motive power for driving a target load in response to power supplied from at least one of the first energy storage device and the second energy storage device, and an internal combustion engine that outputs motive power for driving the target load. The power transmission method includes performing power transmission among the first energy storage device, the second energy storage device, and the actuator by using a charge-depleting (CD) mode and a charge-sustaining (CS) mode. The CD mode is a mode in which at least the motive power of the actuator is usable as motive power for driving the target load so that a total stored energy of the first energy storage device and the second energy storage device is consumed. The CS mode is a mode in which at least the motive power of the internal combustion engine is usable as motive power for driving the target load so that the total stored energy of the first energy storage device and the second energy storage device is less consumed than in the CD mode. In the CD mode, the power transmission is performed in a manner corresponding to a second charge rate that is a charge rate of the second energy storage device. In the CS mode, the power transmission is performed in a manner corresponding to a first charge rate that is a charge rate of the first energy storage device (an eleventh aspect of the present disclosure).

According to this configuration, it is possible to achieve advantages similar to those of the first aspect of the present disclosure.

Obviously, numerous modifications and variations of the present invention are possible in light of the above teachings. It is therefore to be understood that within the scope of the appended claims, the invention may be practiced otherwise than as specifically described herein.

What is claimed is:

1. A motive power system comprising:
a first energy storage device;
a second energy storage device having a higher power density and a lower energy density than the first energy storage device;
an actuator that outputs motive power for driving a target load in response to power supplied from at least one of the first energy storage device and the second energy storage device;
an internal combustion engine that outputs motive power for driving the target load;
a power transmission circuit unit having a function of performing power transmission among the first energy storage device, the second energy storage device, and the actuator; and
a control device having a function of controlling the power transmission circuit unit by using a charge-depleting mode and a charge-sustaining mode,
the charge-depleting mode being a mode in which at least the motive power of the actuator is usable as motive power for driving the target load so that a total stored energy of the first energy storage device and the second energy storage device is consumed,
the charge-sustaining mode being a mode in which at least the motive power of the internal combustion engine is usable as motive power for driving the target load so that the total stored energy of the first energy storage device and the second energy storage device is less consumed than in the charge-depleting mode, wherein
the control device is configured to
control the power transmission circuit unit in the charge-depleting mode in a manner corresponding to a second charge rate that is a charge rate of the second energy storage device, and
control the power transmission circuit unit in the charge-sustaining mode in a manner corresponding to a first charge rate that is a charge rate of the first energy storage device.

2. The motive power system according to claim 1, wherein
the control device is configured to
when power is to be supplied to the actuator in the charge-depleting mode,
determine an amount of supplied power that is output from the first energy storage device and an amount of supplied power that is output from the second energy storage device in accordance with the second charge rate and required output of the actuator, and
control the power transmission circuit unit to realize the determined amounts of supplied power, and
when power is to be supplied to the actuator in the charge-sustaining mode,
determine an amount of supplied power that is output from the first energy storage device and an amount of supplied power that is output from the second energy storage device in accordance with the first charge rate and required output of the actuator, and
control the power transmission circuit unit to realize the determined amounts of supplied power.

3. The motive power system according to claim 1, wherein
the actuator is an actuator that is capable of performing a regenerative operation, and the control device is configured to
during the regenerative operation of the actuator in the charge-depleting mode,
determine an amount of regenerative power that is used to charge the first energy storage device and an amount of regenerative power that is used to charge the second energy storage device in accordance with the second charge rate and a required amount of regeneration of the actuator, and
control the power transmission circuit unit to realize the determined amounts of regenerative power, and
during the regenerative operation of the actuator in the charge-sustaining mode,
determine an amount of regenerative power that is used to charge the first energy storage device and an amount of regenerative power that is used to charge the second energy storage device in accordance with the first charge rate and a required amount of regeneration of the actuator, and
control the power transmission circuit unit to realize the determined amounts of regenerative power.

4. The motive power system according to claim 1, wherein
the control device is configured to selectively execute a control process for any one of the charge-depleting mode and the charge-sustaining mode in accordance with the first charge rate.

5. The motive power system according to claim 1, wherein
the control device is configured to have a function of controlling the power transmission circuit unit to
when power is to be supplied to the actuator in the charge-depleting mode,
while causing the first energy storage device to output a predetermined first base amount of supplied power,
supply to the actuator an amount of supplied power corresponding to required output of the actuator, the amount of supplied power corresponding to the required output being included in the first base amount of supplied power, and
charge the second energy storage device with an amount of supplied power equal to a difference obtained by subtracting the amount of supplied power corresponding to the required output from the first base amount of supplied power.

6. The motive power system according to claim 1, wherein
the control device is configured to have a function of controlling the power transmission circuit unit to
when power is to be supplied to the actuator in the charge-sustaining mode,
while causing the second energy storage device to output a predetermined second base amount of supplied power,
supply to the actuator an amount of supplied power corresponding to required output of the actuator, the amount of supplied power corresponding to the required output being included in the second base amount of supplied power, and
charge the first energy storage device with an amount of supplied power equal to a difference obtained by subtracting the amount of supplied power corresponding to the required output from the second base amount of supplied power.

7. The motive power system according to claim 1, wherein
the control device is configured to, in the charge-sustaining mode, control the power transmission circuit unit by using a control process for a mode selected in accordance with the second charge rate from among a first mode and a second mode, the first mode and the second mode being different in terms of a manner in which the power transmission circuit unit is controlled, and
a control process for the second mode is configured to include controlling the power transmission circuit unit in such a manner that discharge from the second energy storage device is suppressed compared with a control process for the first mode.

8. The motive power system according to claim 1, further comprising:
an electric generator that is capable of outputting generated power by using the motive power of the internal combustion engine, wherein
the power transmission circuit unit is configured to further have a function of performing power transmission between the electric generator and one of the first energy storage device, the second energy storage device, and the actuator, and
the control device is configured to further have a function of executing a power generation control process in the charge-sustaining mode in accordance with at least the second charge rate, the power generation control process being a process for controlling the power transmission circuit unit to charge at least the second energy storage device, out of the first energy storage device and the second energy storage device, with the generated power of the electric generator.

9. The motive power system according to claim 8, wherein
the control device is configured to execute the power generation control process in such a manner as to charge the second energy storage device with the generated power more preferentially than the first energy storage device.

10. A transportation apparatus comprising the motive power system according to claim 1.

11. A power transmission method for a motive power system, the motive power system including a first energy storage device, a second energy storage device having a higher power density and a lower energy density than the first energy storage device, an actuator that outputs motive power for driving a target load in response to power supplied from at least one of the first energy storage device and the second energy storage device, and an internal combustion engine that outputs motive power for driving the target load, the power transmission method comprising:
performing power transmission among the first energy storage device, the second energy storage device, and the actuator by using a charge-depleting mode and a charge-sustaining mode,
the charge-depleting mode being a mode in which at least the motive power of the actuator is usable as motive power for driving the target load so that a total stored energy of the first energy storage device and the second energy storage device is consumed,
the charge-sustaining mode being a mode in which at least the motive power of the internal combustion engine is usable as motive power for driving the target load so that the total stored energy of the first energy storage device and the second energy storage device is less consumed than in the charge-depleting mode, wherein in the charge-depleting mode, the power transmission is performed in a manner corresponding to a second charge rate that is a charge rate of the second energy storage device, and in the charge-sustaining mode, the power transmission is performed in a manner corresponding to a first charge rate that is a charge rate of the first energy storage device.

12. A motive power system comprising:
a first energy storage having a first power density and a first energy density;
a second energy storage having a second power density higher than the first power density and a second energy density lower than the first energy density;
an actuator to drive a load using electric power supplied from at least one of the first energy storage and the second energy storage;
an internal combustion engine to drive the load;
a power transmission circuit via which the actuator is connected to the first energy storage and to the second energy storage; and
circuitry configured to
control the internal combustion engine and the power transmission circuit to drive the load selectively in a charge-depleting mode or in a charge-sustaining mode, at least the actuator driving the load in the charge-depleting mode using a first energy supplied from the first energy storage and/or the second energy storage according to a second charge rate of the second energy storage, at least the internal combustion engine driving the load in the charge-sustaining mode using a second energy that is lower than the first energy and that is supplied to the actuator from the first energy storage and/or the second energy storage according to a first charge rate of the first energy storage.

13. The motive power system according to claim 12, wherein
the circuitry is configured to
when power is to be supplied to the actuator in the charge-depleting mode,
determine an amount of supplied power that is output from the first energy storage and an amount of supplied power that is output from the second energy storage in accordance with the second charge rate and required output of the actuator, and
control the power transmission circuit to realize the determined amounts of supplied power, and
when power is to be supplied to the actuator in the charge-sustaining mode,
determine an amount of supplied power that is output from the first energy storage and an amount of supplied power that is output from the second energy storage in accordance with the first charge rate and required output of the actuator, and
control the power transmission circuit to realize the determined amounts of supplied power.

14. The motive power system according to claim 12, wherein
the actuator is an actuator that performs a regenerative operation, and
the circuitry is configured to
during the regenerative operation of the actuator in the charge-depleting mode,
determine an amount of regenerative power that is used to charge the first energy storage and an amount of regenerative power that is used to charge the second energy storage in accordance with the second charge rate and a required amount of regeneration of the actuator, and
control the power transmission circuit to realize the determined amounts of regenerative power, and
during the regenerative operation of the actuator in the charge-sustaining mode,
determine an amount of regenerative power that is used to charge the first energy storage and an amount of regenerative power that is used to charge the second energy storage in accordance with the first charge rate and a required amount of regeneration of the actuator, and
control the power transmission circuit to realize the determined amounts of regenerative power.

15. The motive power system according to claim 12, wherein
the circuitry is configured to selectively execute a control process for any one of the charge-depleting mode and the charge-sustaining mode in accordance with the first charge rate.

16. The motive power system according to claim 12, wherein
the circuitry is configured to have a function of controlling the power transmission circuit to
when power is to be supplied to the actuator in the charge-depleting mode,
while causing the first energy storage to output a predetermined first base amount of supplied power,
supply to the actuator an amount of supplied power corresponding to required output of the actuator, the amount of supplied power corresponding to the required output being included in the first base amount of supplied power, and
charge the second energy storage with an amount of supplied power equal to a difference obtained by subtracting the amount of supplied power corresponding to the required output from the first base amount of supplied power.

17. The motive power system according to claim 12, wherein
the circuitry is configured to have a function of controlling the power transmission circuit to
when power is to be supplied to the actuator in the charge-sustaining mode,
while causing the second energy storage to output a predetermined second base amount of supplied power,
supply to the actuator an amount of supplied power corresponding to required output of the actuator, the amount of supplied power corresponding to the required output being included in the second base amount of supplied power, and
charge the first energy storage with an amount of supplied power equal to a difference obtained by subtracting the amount of supplied power corresponding to the required output from the second base amount of supplied power.

18. The motive power system according to claim 12, wherein
the circuitry is configured to, in the charge-sustaining mode, control the power transmission circuit by using a control process for a mode selected in accordance with the second charge rate from among a first mode and a second mode, the first mode and the second mode being different in terms of a manner in which the power transmission circuit is controlled, and a control process for the second mode is configured to include controlling the power transmission circuit in such a manner that discharge from the second energy storage is suppressed compared with a control process for the first mode.

19. The motive power system according to claim 12, further comprising:

an electric generator that outputs generated power by using motive power of the internal combustion engine, wherein the power transmission circuit is configured to have a function of performing power transmission between the electric generator and one of the first energy storage, the second energy storage, and the actuator, and the circuitry is configured to have a function of executing a power generation control process in the charge-sustaining mode in accordance with at least the second charge rate, the power generation control process being a process for controlling the power transmission circuit to charge at least the second energy storage, out of the first energy storage and the second energy storage, with the generated power of the electric generator.

20. The motive power system according to claim 19, wherein the circuitry is configured to execute the power generation control process in such a manner as to charge the second energy storage with the generated power more preferentially than the first energy storage.

21. A transportation apparatus comprising the motive power system according to claim 12.

22. A power transmission method for a motive power system including a first energy storage, a second energy storage, an actuator, an internal combustion engine, and a power transmission circuit, the power transmission method comprising:

controlling the internal combustion engine and the power transmission circuit to drive a load selectively in a charge-depleting mode or in a charge-sustaining mode, at least the actuator driving the load in the charge-depleting mode using a first energy supplied from the first energy storage and/or the second energy storage according to a second charge rate of the second energy storage, at least the internal combustion engine driving the load in the charge-sustaining mode using a second energy that is lower than the first energy and that is supplied to the actuator from the first energy storage and/or the second energy storage according to a first charge rate of the first energy storage.

* * * * *